(12) United States Patent
Sumi et al.

(10) Patent No.: US 9,102,093 B2
(45) Date of Patent: Aug. 11, 2015

(54) MOLDING APPARATUS AND MOLDING METHOD

(75) Inventors: Takehiko Sumi, Ebina (JP); Tadatoshi Tanji, Fujisawa (JP); Kenji Iwasaki, Nagoya (JP)

(73) Assignee: KYORAKU CO., LTD., Kyoto (JP)

( * ) Notice: Subject to any disclaimer, the term of this patent is extended or adjusted under 35 U.S.C. 154(b) by 356 days.

(21) Appl. No.: 13/230,196

(22) Filed: Sep. 12, 2011

(65) Prior Publication Data

US 2012/0061886 A1  Mar. 15, 2012

(30) Foreign Application Priority Data

| Sep. 14, 2010 | (JP) | 2010-206137 |
|---|---|---|
| Feb. 28, 2011 | (JP) | 2011-042930 |
| Feb. 28, 2011 | (JP) | 2011-042939 |
| Feb. 28, 2011 | (JP) | 2011-042950 |
| Mar. 3, 2011 | (JP) | 2011-046924 |
| Mar. 3, 2011 | (JP) | 2011-046926 |

(51) Int. Cl.
*B29C 51/02* (2006.01)
*B29C 51/00* (2006.01)
(Continued)

(52) U.S. Cl.
CPC .............. *B29C 51/00* (2013.01); *B29C 47/366* (2013.01); *B29C 51/303* (2013.01); *B29C 47/0004* (2013.01); *B29C 47/005* (2013.01); *B29C 47/0019* (2013.01); *B29C 47/0021* (2013.01); *B29C 47/0052* (2013.01);
(Continued)

(58) Field of Classification Search
CPC  B29C 65/78; B29C 65/7841; B29C 65/7847; B29C 31/002; B29C 51/267; B29C 47/005; B29C 47/0052; B29C 47/0054; B29C 47/0064; B29C 51/303; B29C 51/02; B29C 51/261; B29C 51/262; B29C 47/084
USPC .............. 425/113, 114, 121, 123, 126.1, 388, 425/392, 395, 503, 504, 515, 516, 233, 235
See application file for complete search history.

(56) References Cited

U.S. PATENT DOCUMENTS 4,423,000 A * 12/1983 Teraoka ......................... 264/524
4,617,077 A * 10/1986 Giese et al. .................... 156/245
(Continued)

FOREIGN PATENT DOCUMENTS

| JP | 54-112965 | 9/1979 |
|---|---|---|
| JP | 6-99474 | 4/1994 |

(Continued)

OTHER PUBLICATIONS

Japanese Office action dated Jul. 8, 2014, along with an English-language translation thereof.

(Continued)

*Primary Examiner* — Seyed Masoud Malekzadeh
(74) *Attorney, Agent, or Firm* — Greenblum & Bernstein, P.L.C.

(57) ABSTRACT

The present invention provides a molding apparatus by which it is possible to make a frame located around a mold contact thermoplastic resin. In the molding apparatus of the present invention, the thermoplastic resin extruded from an extruding machine in a sheet form is adsorbed onto a cavity surface of the mold. As a result, the thermoplastic resin is shaped into a shape according to the cavity surface. The molding apparatus includes a frame that is positioned around the mold and is movable relative to the mold. In the frame, a suction part to suck the thermoplastic resin is provided.

13 Claims, 31 Drawing Sheets

(51) Int. Cl.
| | |
|---|---|
| *B29C 51/30* | (2006.01) |
| *B29C 47/36* | (2006.01) |
| *B29C 65/78* | (2006.01) |
| *B29C 47/00* | (2006.01) |
| *B29K 503/04* | (2006.01) |
| *B29K 96/04* | (2006.01) |
| *B29L 31/30* | (2006.01) |
| *B29L 23/00* | (2006.01) |
| *B29C 47/04* | (2006.01) |
| *B29C 47/08* | (2006.01) |
| *B29C 47/16* | (2006.01) |
| *B29K 23/00* | (2006.01) |
| *B29C 47/34* | (2006.01) |
| *B29C 47/54* | (2006.01) |
| *B29C 49/00* | (2006.01) |
| *B29K 105/04* | (2006.01) |
| *B29C 51/10* | (2006.01) |
| *B29C 51/26* | (2006.01) |
| *B29C 49/04* | (2006.01) |
| *B29C 49/42* | (2006.01) |
| *B29K 101/12* | (2006.01) |

(52) U.S. Cl.
CPC ............ *B29C 47/0054* (2013.01); *B29C 47/04* (2013.01); *B29C 47/084* (2013.01); *B29C 47/165* (2013.01); *B29C 47/34* (2013.01); *B29C 47/54* (2013.01); *B29C 49/0005* (2013.01); *B29C 49/041* (2013.01); *B29C 51/02* (2013.01); *B29C 51/10* (2013.01); *B29C 51/261* (2013.01); *B29C 51/267* (2013.01); *B29C 65/78* (2013.01); *B29C 65/7841* (2013.01); *B29C 65/7847* (2013.01); *B29C 2049/047* (2013.01); *B29C 2049/4294* (2013.01); *B29C 2791/001* (2013.01); *B29C 2791/006* (2013.01); *B29C 2947/926* (2013.01); *B29C 2947/9259* (2013.01); *B29C 2947/92647* (2013.01); *B29C 2947/92857* (2013.01); *B29C 2947/92904* (2013.01); *B29C 2947/92923* (2013.01); *B29C 2947/92933* (2013.01); *B29K 2023/06* (2013.01); *B29K 2023/12* (2013.01); *B29K 2096/04* (2013.01); *B29K 2101/12* (2013.01); *B29K 2105/04* (2013.01); *B29K 2223/06* (2013.01); *B29K 2223/12* (2013.01); *B29K 2503/04* (2013.01); *B29L 2023/003* (2013.01); *B29L 2023/004* (2013.01); *B29L 2023/22* (2013.01); *B29L 2031/3032* (2013.01)

(56) References Cited

U.S. PATENT DOCUMENTS

| | | | | |
|---|---|---|---|---|
| 4,617,683 | A * | 10/1986 | Christoff | 383/63 |
| 4,815,955 | A * | 3/1989 | Krall | 425/116 |
| 5,308,573 | A * | 5/1994 | Hirakawa | 264/516 |
| 6,645,598 | B2 * | 11/2003 | Alderman | 428/69 |
| 7,175,791 | B2 * | 2/2007 | Pappert et al. | 264/146 |
| 7,842,226 | B2 * | 11/2010 | Polk et al. | 264/554 |
| 7,976,754 | B2 * | 7/2011 | Tardy et al. | 264/209.3 |
| 8,119,048 | B2 * | 2/2012 | Nishimura | 264/252 |
| 8,419,993 | B2 * | 4/2013 | Franke-Maintz et al. | 264/250 |
| 8,562,898 | B2 * | 10/2013 | Tanji et al. | 264/515 |
| 2002/0105115 | A1* | 8/2002 | Sadr | 264/510 |
| 2003/0164572 | A1* | 9/2003 | Pappert et al. | 264/150 |
| 2005/0200051 | A1* | 9/2005 | Ricciardelli et al. | 264/511 |
| 2005/0279448 | A1* | 12/2005 | Darcy et al. | 156/272.8 |
| 2008/0258329 | A1* | 10/2008 | Polk et al. | 264/101 |
| 2008/0258354 | A1* | 10/2008 | Polk et al. | 264/503 |
| 2009/0057945 | A1* | 3/2009 | Tardy et al. | 264/209.3 |
| 2010/0014232 | A1* | 1/2010 | Nishimura | 361/679.3 |
| 2011/0101558 | A1* | 5/2011 | Onodera et al. | 264/51 |

FOREIGN PATENT DOCUMENTS

| | | |
|---|---|---|
| JP | 11-254509 | 9/1999 |
| JP | 2000-289093 | 10/2000 |
| JP | 2001-239824 | 9/2001 |
| JP | 2004-122488 | 4/2004 |
| JP | 2004-181630 | 7/2004 |
| JP | 2005-125736 | 5/2005 |
| JP | 2009-241528 | 10/2009 |
| JP | 2010-201661 | 9/2010 |
| JP | 2011-020359 | 2/2011 |
| JP | 2012-061643 | 3/2012 |
| JP | 2012-179752 | 9/2012 |
| WO | 2009/157197 | 12/2009 |
| WO | 2010/149336 | 12/2010 |

OTHER PUBLICATIONS

Japanese Official Action for Japanese Application No. 2011-046924 dated Dec. 16, 2014, along with a partial English-language translation thereof.

* cited by examiner

FIG. 11

| RESIN | MATERIAL COMPOUND RATIO | | | EXPANSION RATIO |
|---|---|---|---|---|
| | RESIN A (X) LONG CHAINED HDPE | RESIN B (Y) LONG CHAINED PP | RESIN C OBC | |
| EXAMPLE 1 | 50 | 50 | | 2.9 TIMES |
| EXAMPLE 2 | 50 | 45 | 5 | 4.2 TIMES |
| EXAMPLE 3 | 50 | 40 | 10 | 4.7 TIMES |
| EXAMPLE 4 | 50 | 30 | 20 | 4.0 TIMES |
| EXAMPLE 5 | 50 | 10 | 40 | 3.7 TIMES |

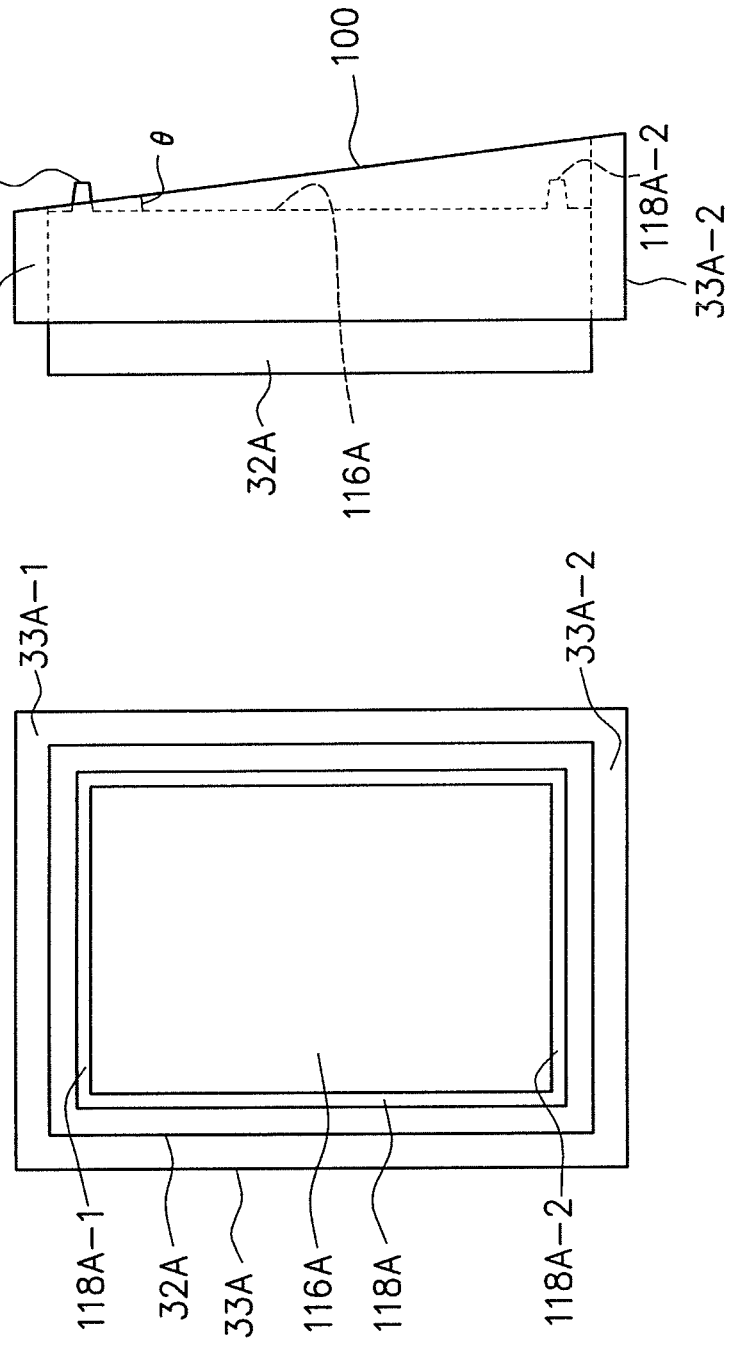

MOLDING APPARATUS AND MOLDING METHOD

BACKGROUND OF THE INVENTION

1. Technical Field

The present invention relates to a molding apparatus and a molding method for molding a resin molded product.

2. Background Art

The following methods are methods of molding a duct, which is an example of a resin molded product. Two pre-molded sheets are reheated and placed in a molten state between a pair of upper and lower molds. After this, a pressurized liquid is blown in between the two sheets, while closing and adjusting the pair of molds. Consequently, a climate control duct is formed in which the first half and the second half are joined as a single unit.

Furthermore, for example, a sheet blow molding method using a foamed resin sheet is disclosed in JP-A 2001-239824 (Patent Document 1) and JP-A 2000-289093 (Patent Document 2).

In the sheet blow molding method, two thermoplastic resin sheets cut in a predetermined size in advance are heated with an infrared heater and softened. Next, the sheet is pinched-off from the mold. Then, the sheet is attached firmly to the surface of the cavity by the blowing of a pressurized fluid between the sheets. Due to this, the sheet is molded into the desired shape.

However, in the sheet blow molding method mentioned above, sheets prepared in advance in room temperature are softened during sheet blow molding by reheating it with radiant heat sources such as infrared heaters. Therefore, for example, when foamed resin sheets are used, it is difficult for the sheet to be in a uniform molten state including its internal mass. In addition to this, when compared with molten and extruded sheets, the reheated sheets contain less heat. Therefore, not only does this cause poor traceability for the sheet along the mold's cavity, but also inadequate adhesion at each pinched-off section (parting line) of the two sheets. Given this situation, it is desirable to improve the adhesion of the sheets.

Furthermore, WO 2009/157197 (Patent Document 3) is an example of the related art by the present applicant. A molding apparatus of molding a resin molded product using a molten thermoplastic resin sheet is disclosed in this document.

Further, in the molding apparatus disclosed in the above mentioned Patent Document 3, the thermoplastic resin is intermittently extruded, in a predetermined extrusion amount per unit time, from the extrusion slit with a fixed gap provided on the T-Die. This extrusion is performed at a predetermined extrusion rate, such that the molten thermoplastic resin sheet suspends downward. Then, the thermoplastic resin sheet extruded downward is passed between a pair of rollers. The thermoplastic resin sheet is compressed between these rollers by narrowing the distance between this pair of rollers. Then, by rotating the pair of rollers, the thermoplastic resin sheet is sent downward. While sending the thermoplastic resin sheet through the pair of rollers, the rotation speed of the pair of rollers is adjusted so that the transmission rate of the thermoplastic resin sheet from the pair of rollers is greater than the extrusion rate of the thermoplastic resin sheet being extruded from the extrusion slit. Thus draw-down or necking-in of the thermoplastic resin sheet is effectively prevented. As a result, the thermoplastic resin sheet is formed with uniform thickness in the extruding direction. Furthermore, draw-down is the effect in which over a period of time, the molten sheet under its own weight gets stretched, and becomes thinner toward the upper part of the sheet. Also, necking-in is the effect in which the sheet width becomes lessened by contraction of the sheet due to draw-down in the width direction.

In the molding apparatus disclosed in the above Patent Document 3, a resin molded product is formed using the thermoplastic resin sheet extruded from the T-Die. Thus, the wave effect (curtain effect) may occur in the thermoplastic resin sheet extruded from the T-Die.

If the curtain effect occurs on the thermoplastic resin sheet, even when a frame comes in contact with the lateral surface of the thermoplastic resin sheet, a gap occurs between the thermoplastic resin sheet and the frame. Thus, it becomes impossible to form a closed space between the thermoplastic resin sheet, the frame, and the surface of the cavity.

Further, JP-A-06-99474 (Patent Document 4) and JP-A-54-112965 (Patent Document 5) disclose the structure of a molding apparatus using frames. In these as well, problematic situations similar to those in Patent Document 3 could occur.

SUMMARY

An object of the present invention is to provide a molding apparatus and a molding method, which can bring the frame positioned on the perimeter of the mold into proper contact with the thermoplastic resin.

<Molding Apparatus>

A molding apparatus of this invention is a molding apparatus that adsorbs thermoplastic resin extruded in a sheet form from an extruding machine, onto a cavity surface of a mold, and shapes the thermoplastic resin into a shape according to the cavity surface, comprising a frame that is positioned on a perimeter of the mold and is movable relative to the mold, wherein a suction part for sucking the thermoplastic resin is provided in the frame.

<Molding Method>

A molding method of this invention includes:

a sucking step in which air is sucked in from a suction part provided in a frame positioned on a perimeter of a mold so as to adsorb thermoplastic resin extruded from an extruding machine in a sheet form onto the frame, and to bond the thermoplastic resin to the frame; and a shaping step in which the thermoplastic resin facing a cavity surface of the mold is adsorbed onto the cavity surface, to shape the thermoplastic resin into a shape according to the cavity surface.

BRIEF DESCRIPTION OF THE DRAWINGS

FIG. 11 illustrates the example of a first embodiment;

FIGS. 25A and 25B are the first figures showing the configuration example of the split mold blocks and the frames in the third embodiment;

EXEMPLARY EMBODIMENTS

First Embodiment

An Overview of the Molding Method of the Resin Molded Product in the First Embodiment First, an overview of the molding method of the resin molded product in the present embodiment is explained with reference to FIGS. 1 through 4.

Figure 1:
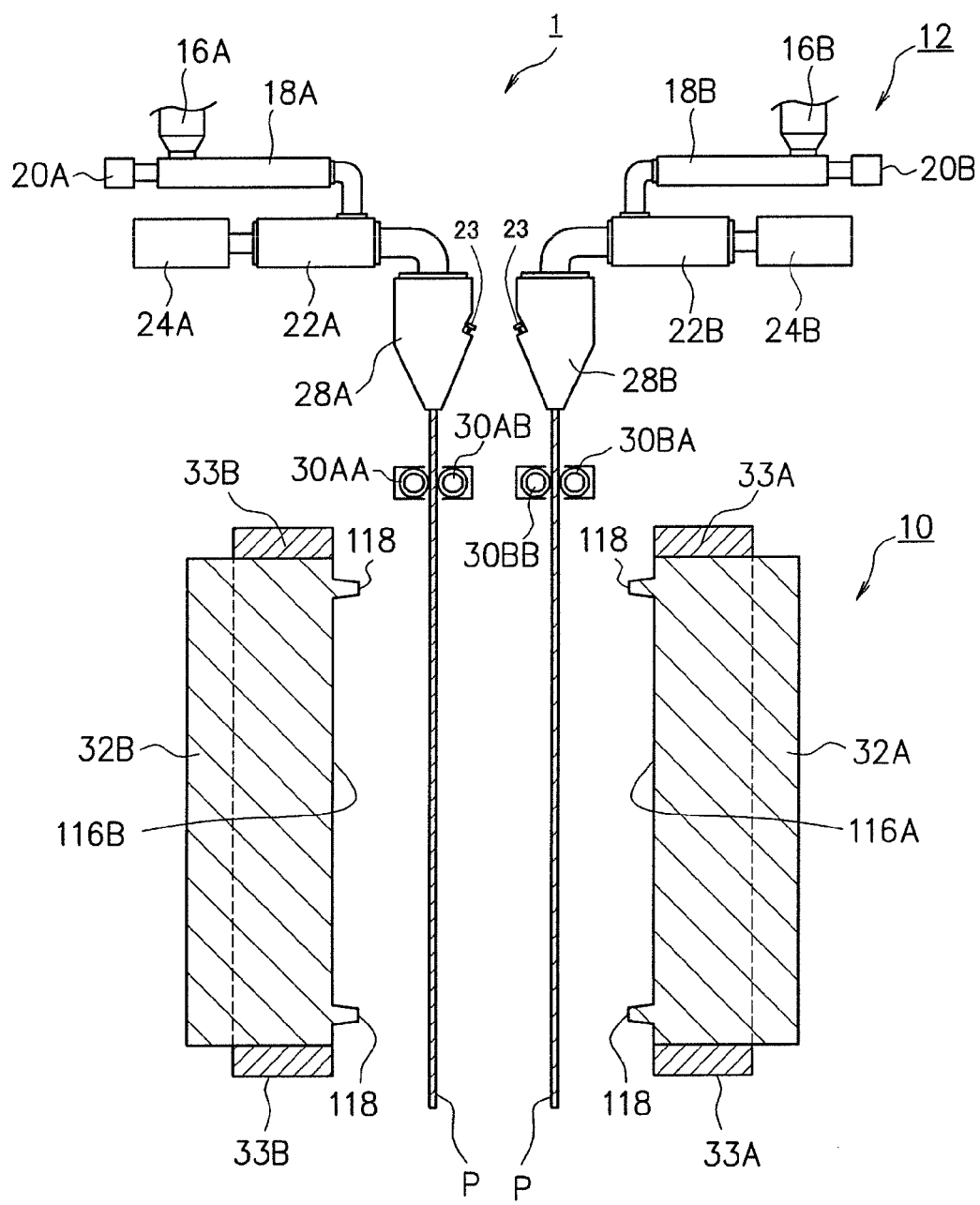
FIG. 1 shows the configuration example of the molding apparatus which implements the molding method of a climate control duct in the present embodiment.

The molding method of the resin molded product in the present embodiment is implemented using a molding apparatus 1, as shown in FIG. 1. First, as shown in FIG. 1, a molten thermoplastic resin sheet P is placed between split mold blocks 32A and 32B.

Figure 2:
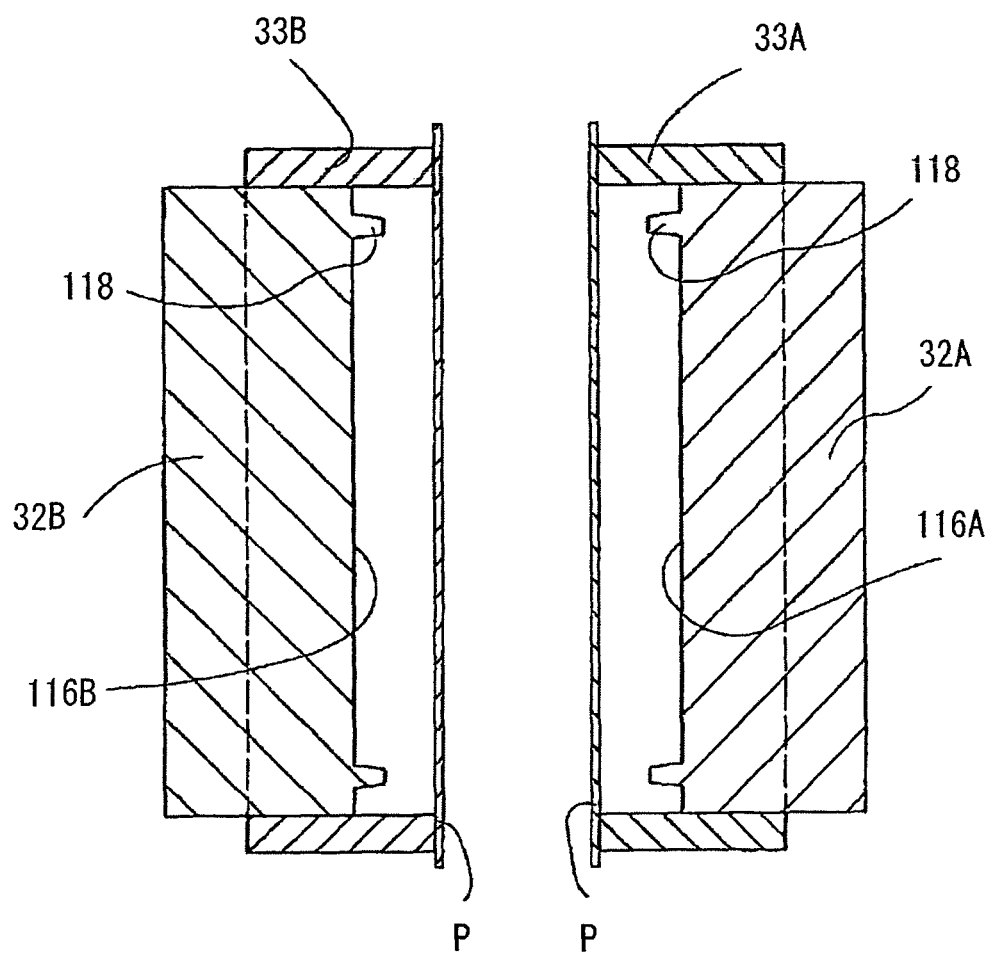
FIG. 2 shows the process, wherein in the molding apparatus 1 shown in FIG. 1, a pair of thermoplastic foamed resin sheets is placed in a pair of split mold blocks, and the gap of the cavity surface of the split mold block is closed by the frame.

Next, as shown in FIG. 2, air is sucked by a suction part (not shown) provided in a frame 33A (33B) located on the perimeter of the split mold block 32A (32B). Thus, the thermoplastic resin sheet P is adsorbed onto the frame 33A (33B). Thus, the thermoplastic resin sheet P gets bonded to the frame 33A (33B).

Figure 3:
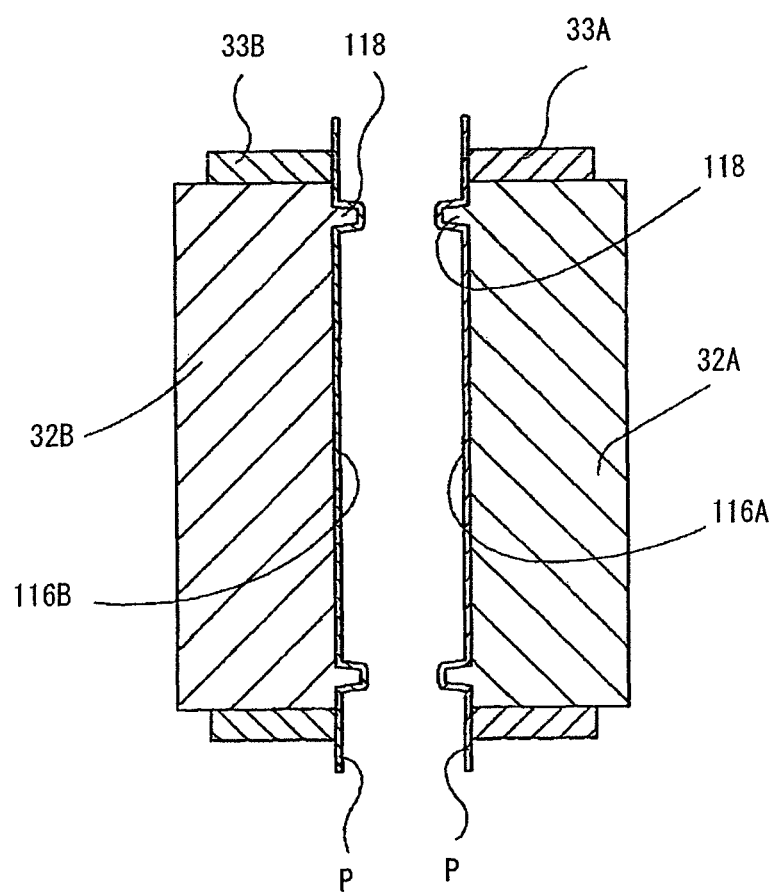
FIG. 3 shows the vacuum adsorption process wherein, after the process shown in FIG. 2, each thermoplastic foamed resin sheet P is adsorbed onto the cavity surface of the split mold block by a vacuum.
Figure 4:
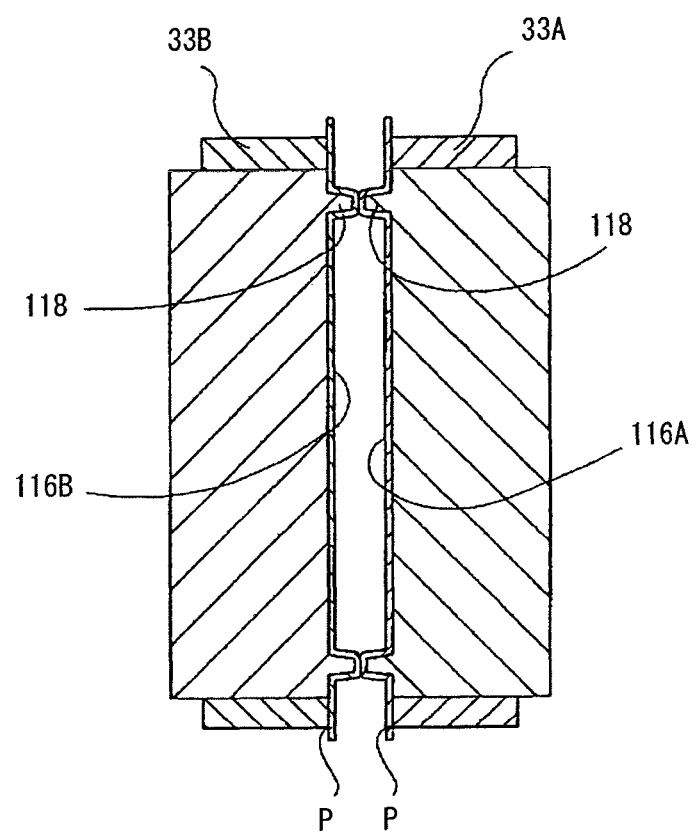
FIG. 4 shows the molding process wherein, after the process shown in FIG. 3, the climate control duct is formed as a molded product by the closing of the split mold blocks.

Next, as shown in FIG. 3, the thermoplastic resin sheet P is adsorbed onto cavity surfaces 116A and 116B of the split mold blocks 32A and 32B. Moreover, as shown in FIG. 4, the split mold blocks 32A and 32B are closed. Thus, the resin molded product is formed.

In the molding method of the resin molded product in the present embodiment, air is sucked by the suction part provided in the frame 33A (33B). Due to this, the thermoplastic resin sheet P is adsorbed onto the frame 33A (33B). Thus, the thermoplastic resin sheet P attaches firmly to the frame 33A (33B). This allows the frame 33A (33B) to make secure contact with the thermoplastic resin sheet P.

Also, the molding method of the resin molded product of the present embodiment, molds the resin molded product by placing the molten thermoplastic resin sheet P between the split mold blocks 32A and 32B, and closing the split mold blocks 32A and 32B. This improves the adhesion of the thermoplastic resin sheet P. Below, the molding method of the resin molded product of the present embodiment, is explained in detail with reference to the attached drawings. Further, in the following embodiment, the molding method of a climate control duct 18, which is an example of the resin molded product, is described using an example.

<Example of Molding Method of Climate Control Duct 18>

Figure 5:
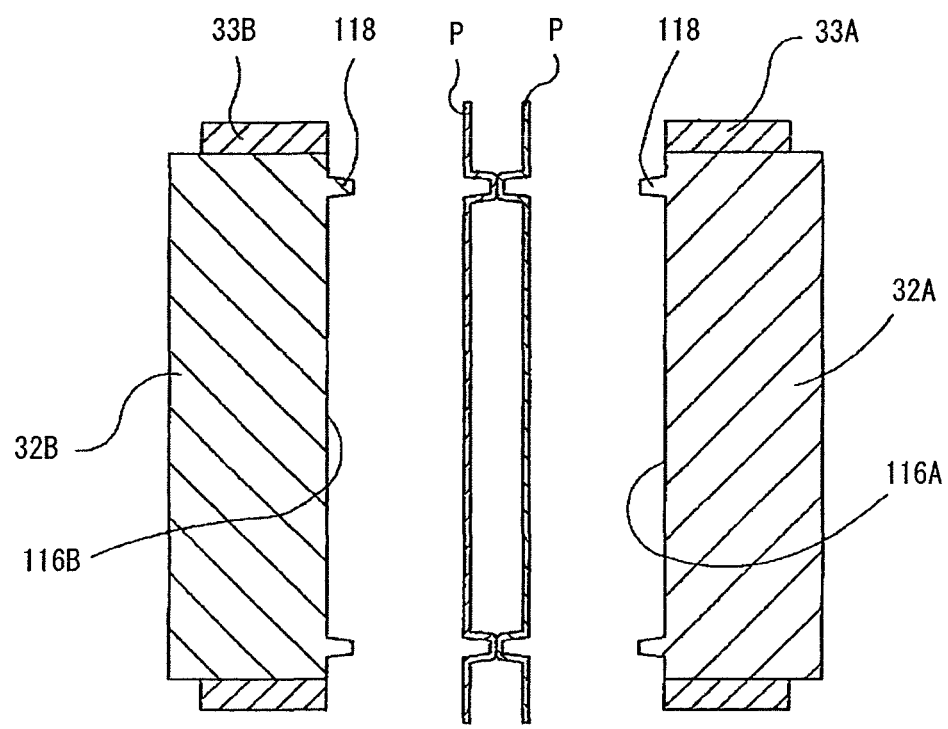
FIG. 5 shows the ejecting process wherein, after the process shown in FIG. 4, the split mold blocks open and the molded product of the climate control ducts is ejected.
Figure 6:
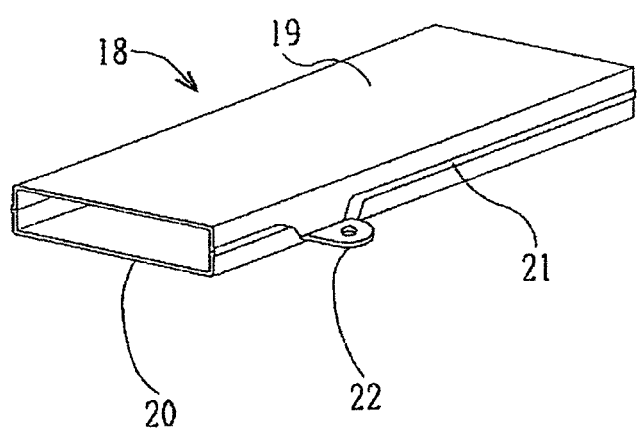
FIG. 6 is a perspective view of the climate control duct molded by the molding apparatus shown in FIG. 1.
Figure 7:
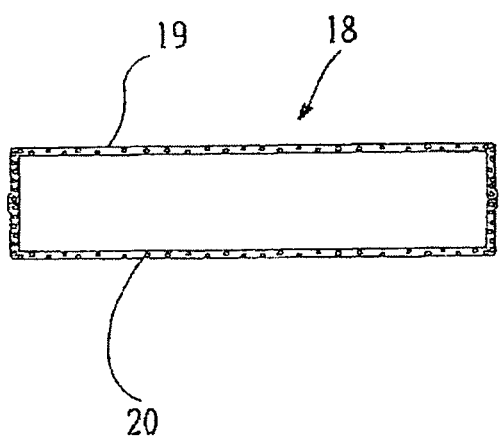
FIG. 7 is an enlarged cross-sectional view of the climate control duct shown in FIG. 6.

First, with reference to FIGS. 1 through 5, an example of a molding method of a climate control duct 18 as shown in FIGS. 6 and 7 is explained. FIG. 1 is a configuration example of the molding apparatus 100 that molds the climate control duct 18 as shown in FIGS. 6 and 7. FIGS. 2 through 5 illustrate the molding processes of the climate control duct 18.

The climate control duct 18, as shown in FIGS. 6 and 7, is a lightweight climate control duct used for ventilation of climate controlled air, supplied by an air conditioning unit, to a desired location. The climate control duct 18 of this present embodiment has foamed wall surfaces (a first wall 19 and a second wall 20, in the same manner below). These wall surfaces have closed air cell structures (closed air cell ratios of 70% or more), which contain a plurality of air cells (having an expansion ratio of 2.0 times or more). Moreover, the climate control duct 18 includes a parting line 21 and a fitting piece 22. The climate control duct 18 of this present embodiment is attached to other parts with the fitting piece 22.

The average wall thickness of the walls 19 and 20 of the climate control duct 18 in the present embodiment is 3.5 mm or less. The average diameter of the air cells of the walls 19 and 20, in thickness direction, is less than 300 μm, preferably less than 100 μm.

The material of the climate control duct 18 in this present embodiment may be a polypropylene type resin. Preferably, this material should be a blended resin of polyethylene type resin and polypropylene type resin. The preferred tensile fracturing elongation of the material for the climate control duct 18 should be 40% or more at −10° C. Moreover, a tensile elasticity of 1000 kg/cm$^3$ or more at room temperature is preferred for this material. In addition to this, the tensile fracturing elongation of this material is preferably 100% or more at −10° C. The measuring methods of the material characteristics and the definitions of the expansion ratio are shown below.

Tensile fracturing elongation: The walls 19 and 20 of the climate control duct 18 obtained from the molding method of the present embodiment were cut and stored at −10° C. After this, from this cut portion, specimen No. 2 was shaped in accordance with JIS K-7113 (ISO 527). The tensile fracturing elongation of this specimen was measured by applying tension at a rate of 50 mm/minute.

Tensile elasticity: The walls 19 and 20 of the climate control duct 18 obtained from the molding method of the present embodiment were cut. Using this cut portion, specimen No. 2 was shaped in accordance with JIS K-7113 in room temperature (23° C.). The tensile elasticity of this specimen was measured by applying tension at a rate of 50 mm/minute.

Expansion ratio: Expansion ratios were determined by dividing the density of the thermoplastic resin used in the molding method of the present embodiment by the apparent density of walls 19 and 20 of the climate control duct 18 obtained from the molding method of the present embodiment.

Melt flow rate (MFR): Measured with testing temperatures at 230° C., and a test load of 2.16 kg, in accordance with JIS K-7210 (ISO 1133).

Izod impact strength: The walls 19 and 20 of the climate control duct 18 obtained from the molding method of the present embodiment were cut and stored at −20° C. After this, several small pieces measuring 80×10 (length×breadth in mm) were cut. These sheets were layered to form a 4 mm thickness, and used as a specimen. This specimen was used for measurement, in accordance with JIS K-7110(ISO 180) (notched).

<A Configuration Example of Molding Apparatus 100>

First, with reference to FIG. 1, a configuration example of the molding apparatus 100 for molding the climate control duct 18 in the present embodiment is explained.

The molding apparatus 100 as shown in FIG. 1 has an extruding machine 12 and a clamping machine 10. Two molten thermoplastic foamed resin sheets P are extruded from the extruding machine 12 to the clamping machine 10. In the clamping machine 10, the two molten thermoplastic foamed resin sheets P are placed between a pair of split mold blocks. The two sheets adhere on the inner surfaces (surfaces of the cavity) of the split mold blocks by the closing of these molds. Through this, the climate control duct 18, as shown in FIGS. 6 and 7, is formed.

The extruding machine 12 includes: a first accumulator 22A, a second accumulator 22B, a first plunger 24A, a second plunger 24B, a first T-Die 28A, a second T-Die 28B, a first cylinder 18A, a second cylinder 18B, a first thermoplastic resin supply hopper 16A, a second thermoplastic resin supply hopper 16B, a first pair of rollers 30AA and 30AB, a second pair of rollers 30BA and 30BB, a first electric motor 20A, and a second electric motor 20B.

The clamping machine 10 includes the split mold blocks 32A and 32B, and the frames 33A and 33B. The frame 33A (33B) is positioned at the perimeter of the split mold block 32A (32B). The split mold block 32A (32B) contains a cavity surface 116A (116B) and a pinch-off molding part 118. The gap between the split mold block 32A (32B) and the frame 33A (33B) should preferably be 0.1 mm or more and less than 1.0 mm, more preferably 0.1 mm or more and less than 0.5 mm. Setting such gaps can prevent the clogging of resins in the gap between the split mold block 32A (32B) and the frame 33A (33B), as well as hindrance in the function of the split mold block 32A (32B) and the frame 33A (33B) in cases of thermal expansion.

<Molding Process Example of Climate Control Duct 18>

Next, the molding process example of the climate control duct 18 is explained, with reference to FIGS. 1 through 5.

First, as shown in FIG. 1, two thermoplastic foamed resin sheets P (molten thermoplastic foamed resin sheets containing air cells) are extruded from the first T-Die 28A and the second T-Die 28B, in order to form the first wall 19 and the second wall 20. The two thermoplastic foamed resin sheets P are suspended between the pair of the split mold block 32A and the split mold block 32B.

Next, the frame 33A (33B) and the split mold block 32A (32B) are moved forward horizontally. Due to this, as shown in FIG. 2, the frame 33A (33B) located at the perimeter of the pair of the split mold block 32A (32B) come into contact with thermoplastic foamed resin sheets P. Then, the thermoplastic foamed resin sheets P are sucked in by a suction part (not illustrated) built into the frame 33A (33B). This allows the sheets P to be retained on the frame 33A (33B). Also, this can allow shaping of a closed space between the thermoplastic foamed resin sheets P and the cavity surface 116A (116B) of the split mold block 32A (32B).

Next, while the thermoplastic foamed resin sheets P are retained on the frame 33A (33B), the split mold block 32A (32B) is moved forward horizontally. Moreover, as shown in FIG. 3, the thermoplastic foamed resin sheets P are vacuum-adsorbed onto the cavity surface 116A (116B) of the split mold block 32A (32B). This shapes the thermoplastic foamed resin sheets P according to the cavity surface 116A (116B).

Next, the frame 33A (33B) and the split mold block 32A (32B) are moved forward horizontally. By this, as shown in FIG. 4, the frame 33A and the split mold block 32A, and the frame 33B and the split mold block 32B are closed together. Due to this, the pinch-off molding parts 118 of the pair of split mold blocks 32A and 32B come into contact with each other. Consequently, the two thermoplastic foamed resin sheets P bond and thermally fuse, forming a parting line along the bonding surface of the two thermoplastic foamed resin sheets P. In this way, the molded product of the climate control duct 18 is formed.

Furthermore, after closing the split mold blocks 32A and 32B, air may be blown between the sheets P. The blow of air, for example, can be applied with a pressure between 1 and 3 kgf/cm$^2$. This allows greater accuracy in shaping the duct to correspond to the shape of the mold.

Next, the molded product of the climate control duct 18 is cooled within the pair of split mold blocks 32A and 32B.

Next, the frame 33A and the split mold block 32A, and the frame 33B and the split mold block 32B are moved backward horizontally. Due to this, as shown in FIG. 5, the frame 33A and the split mold block 32A, and the frame 33B and the split mold block 32B, are separated from the molded product of the climate control duct 18.

Next, the burrs along the perimeter of the parting line, formed by the pinch-off molding part 118, are removed. The result is the climate control duct 18, as shown in FIGS. 6 and 7.

Furthermore, the thickness, extrusion speed, and wall thickness distribution of extrusion directions of the two thermoplastic foamed resin sheets P hung between the pair of split mold blocks 32A and 32B, are adjusted individually to prevent variances of the wall thickness that occur due to draw-down and necking-in.

Each expanded thermoplastic foamed resin sheet P is formed as follows. The thermoplastic foamed resin with an added foaming agent is melted and mixed by the first cylinder 18A and the second cylinder 18B. Next, the thermoplastic foamed resin sheet is temporarily stored in an accumulation chamber of the first accumulator 22A, and an accumulation chamber of the second accumulator 22B. This thermoplastic foamed resin is supplied to the first T-Die 28A by the first plunger 24A and to the second T-Die 28B by the second plunger 24B, at a fixed interval. In addition to this, it is also possible to mix into the thermoplastic foamed resin, for example, a foam nucleating agent or a coloring pigment (carbon black), to act as the foaming source in the first cylinder 18A and the second cylinder 18B.

The thermoplastic foamed resin sheets P extruded from the first T-Die 28A and the second T-Die 28B are compressed respectively, by the first pair of rollers 30AA and 30AB, and the second pair of rollers 30BB and 30BA. With these rollers, the thermoplastic foamed resin sheets P are placed between the pair of the split mold block 32A and the split mold block 32B. During this procedure, the thickness and the wall thickness distribution of each thermoplastic foamed resin sheet P are individually adjusted.

To be specific, first, the extrusion speed of each thermoplastic foamed resin sheet P is set individually, by the first accumulator 22A and the second accumulator 22B, and the first T-Die 28A and the second T-Die 28B.

It is possible to appropriately select the extrusion capacity of the first cylinder 18A and the second cylinder 18B connected respectively to the first accumulator 22A and the second accumulator 22B, according to the size of the climate control duct 18 to be finally molded. However, an extrusion capacity of 50 kg/hour or more is preferred for the first cylinder 18A and the second cylinder 18B. This makes it possible to shorten the molding cycle of the climate control duct 18.

Also, for preventing draw-down, extrusion of the thermoplastic foamed resin sheets P from the first T-Die 28A and the second T-Die 28B needs to be completed in 40 seconds or less, preferably in 30 seconds or less.

For this reason, the thermoplastic foamed resin, retained in the accumulation chamber of the first accumulator 22A and the accumulation chamber of the second accumulator 22B, should be extruded through the slit opening of the first T-Die 28A and the second T-Die 28B at 50 kg/hour or more per 1 $cm^2$, preferably at 60 kg/hour or more. During this, draw-down can be kept minimal by changing the slit gaps of the first T-Die 28A and the second T-Die 28B along with the extrusion of the thermoplastic foamed resin sheets P.

In short, the thickness of the upper wall of the thermoplastic foamed resin sheets P tends to be thinner, as it becomes stretched by its own weight due to the draw-down effect. On the other hand, the slit openings of the first T-Die 28A and the second T-Die 28B corresponding to the upper part of thermoplastic foamed resin sheets P, can be gradually widened as extrusion of the resin sheet P takes place. By doing this, the wall thickness of thermoplastic foamed resin sheets P can be adjusted to be uniform from top to bottom.

Additionally, it is also possible to differentiate the extrusion speed of the thermoplastic foamed resin sheets P being extruded from the first T-Die 28A and the second T-Die 28B, and the rotation speed of the first pair of rollers 30AA and 30AB, and the second pair of rollers 30BB and 30BA. This then allows a difference to be set between the extrusion speed of the thermoplastic foamed resin sheets P from the first T-Die 28A and the second T-Die 28B, and the feeding rate of the thermoplastic foamed resin sheets P from the first pair of rollers 30AA and 30AB, and the second pair of rollers 30BB and 30BA. Consequently, the thermoplastic foamed resin sheets P can be expanded between the first T-Die 28A and the second T-Die 28B, and the first pair of rollers 30AA and 30AB and the second pair of rollers 30BB and 30BA. As a result, thickness of the resin sheets P can be adjusted to be smaller.

Each thermoplastic foamed resin supplied to the first T-Die 28A and the second T-Die 28B is extruded from the slit of the T-Die body as the thermoplastic foamed resin sheets P, after passing through resin ducts starting from the manifold of each T-Die body (not illustrated). The T-Die body is made by overlapping a die upon another die. In the tip of the T-Die body, one die lip and another die lip face each other with a gap therebetween. This slit gap is set by using a slit gap adjustment device 23.

The thicknesses of the resin sheets P extruded from the first T-Die 28A and the second T-Die 28B are determined by the slit gap. Specifically, the thickness of each thermoplastic foamed resin sheet P extruded from the first T-Die 28A and the second T-Die 28B is 0.6 to 6.0 mm.

Moreover, the slit gap is adjusted by a known slit gap adjustment device 23. Uniformity in the width direction of the resin sheets P is adjusted by making adjustments on the slit gap. In addition to this, another die lip is altered by the slit gap adjustment device 23, during intermittent extrusion of the resin sheet P from beginning to end. Due to this, the thicknesses in the extruding direction of the resin sheets P are adjusted.

A thermal expansion device and a mechanical device are available for the slit gap adjustment device 23. It is preferable to use the slit gap adjustment device 23 equipped with both functions.

A plurality of slit gap adjustment devices 23 are placed at equal intervals along the width of the slit. The thickness of the resin sheet P can be made uniform along the entire width, by the narrowing or widening of corresponding slit gaps with each slit gap adjustment device 23.

The slit gap adjustment device 23 includes a die bolt set to freely move toward or away from a die lip. An adjustment shaft is placed, through the pressure transmission part, at the tip of the die bolt. On the adjustment shaft, clutch pieces are fastened with tie bolts. The clutch pieces are linked to one die lip. As the die bolt moves forward, the adjustment shaft is pushed toward the tip through the pressure transmission part. Consequently, the die lip is pressed. Subsequently, the die lip is deformed by the sections grooved in. For this reason, the slit gaps become narrow. On the contrary, in order to widen the slit gap, the die bolt is slid backward.

Additionally, the slit gap can be adjusted more precisely by implementing a thermal expansion adjustment device, in addition to the above mentioned mechanical adjustment device. More specifically, the die lip is pressed due to the thermal expansion of the adjustment shaft being heated by an electric heater, not shown. This causes narrowing of the slit gap.

Moreover, to widen the slit gap, the electric heater is stopped, and the adjustment shaft is cooled by cooling procedures not illustrated. This causes the adjustment shaft to shrink, making the slit gap wider.

At the time when the resin sheet P extruded from the first T-Die 28A and the second T-Die 28B is suspended between the pair of the split mold block 32A and the split mold block 32B, or when the split mold block 32A and the split mold block 32B are closed, it is preferable that the thickness in the extruding direction of the resin sheet P be adjusted to be uniform. In such a case, the slit gap widens gradually as extrusion of the resin sheet P takes place, and reaches its maximum when extrusion of the resin sheet P ends.

Consequently, the thickness of the resin sheets P extruded from the first T-Die 28A and the second T-Die 28B gradually becomes thicker after the extrusion of the resin sheets P begin. However, as the resin sheet P extruded in the molten state stretches due to its own weight (draw-down effect), thickness of the resin sheet P tends to gradually become thinner toward the upper section. Therefore, the thickness gained by widened slit gaps, and the thinner area due to the draw-down effect, balance each other out. This allows the thickness of the resin sheet P to be adjusted uniformly from top to bottom.

As mentioned above, if the pressure (injection pressure) when extruding the resin sheet P from the T-Die, the extrusion speed (injection speed) of the resin, the roller rotation speed, and the slit gap of the T-Die, are constant during injection, the extruded resin sheet P will experience drawdown (necking) due to its own weight. Hence, as lower sections of the resin sheet P become thicker, upper sections on the other hand tend to become thinner. Therefore, the thickness of the resin sheet P can be adjusted by multiple-stage settings of injection pressure, injection speed, and roller feeding speed, during injection. More specifically, upper sections of the resin sheet P being thinner can be controlled by gradually raising the injection pressure and injection speed during injection. Also, the necking of the resin sheet P due to its own weight can be controlled by increasing the rotation speed (feeding speed) of the roller during injection.

These parameters (injection pressure, injection speed, roller rotation speed) are relatively easy to adjust by controlling the cylinder and the accumulator with a program. Therefore, these parameters are suitable for adjusting the wall thickness of the resin sheet P.

Moreover, when the material of the resin sheet P is a resin with high membrane forming properties (for example, a resin in which inorganic filler such as talc is added to a polypropylene type resin), uniform thickness of the resin sheet P can be obtained without making major adjustments to injection pressure, injection speed, and roller rotation speed, during injection.

Figure 8:
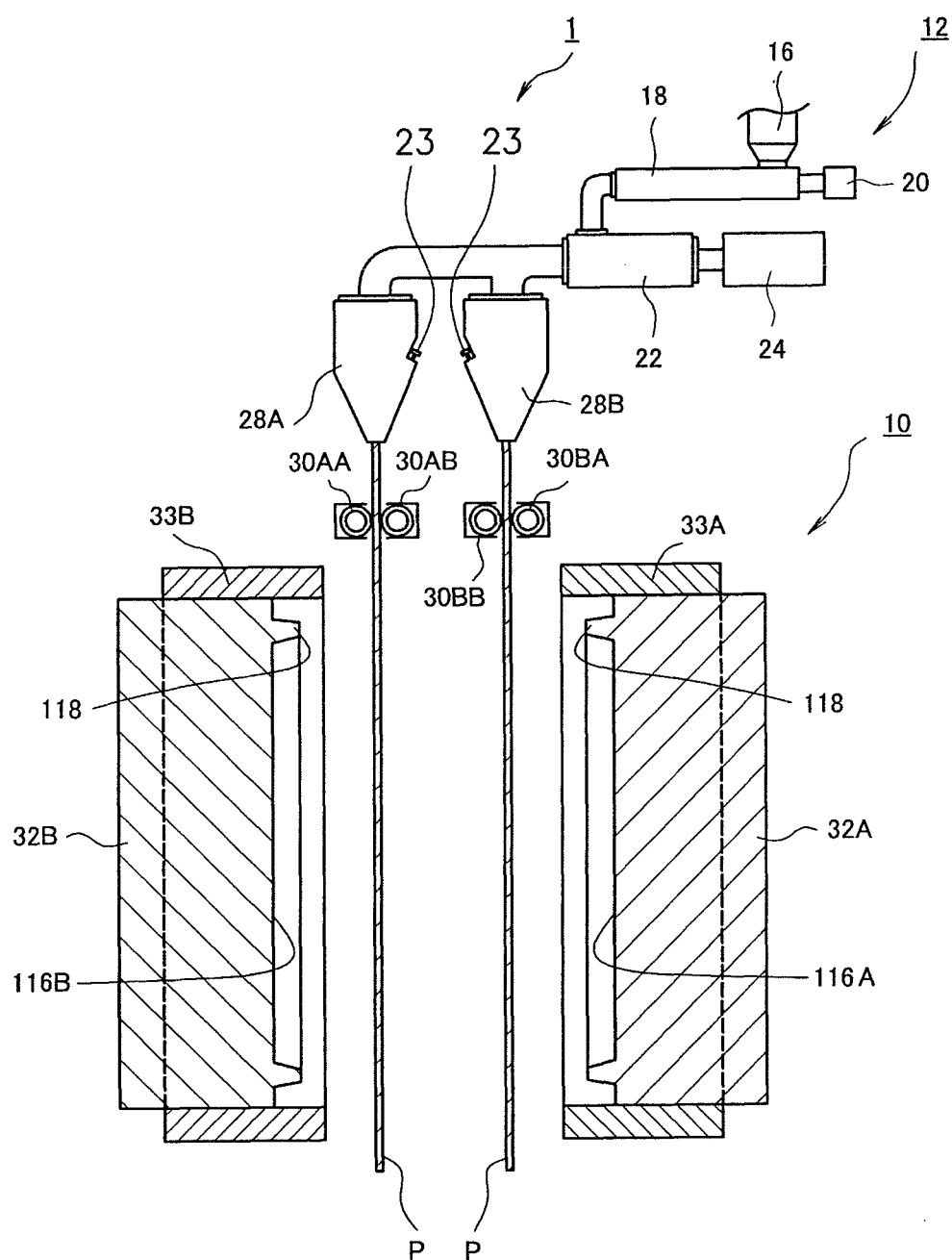
FIG. 8 shows another configuration example of the molding apparatus implementing the molding method of the climate control duct of the present embodiment.

Moreover, in the molding apparatus 100 illustrated in FIG. 1 mentioned above, supply ducts of the thermoplastic foamed resin for the first T-Die 28A and the second T-Die 28B are independent. However, as shown in FIG. 8, it is also possible to connect a single cylinder 18 and a single accumulator 22 connected to the cylinder 18, to the first T-Die 28A and the second T-Die 28B. In such a case, branching at the tip of the accumulator 22 will allow supply of thermoplastic foamed resin into the first T-Die 28A and the second T-Die 28B. In addition to this, an accumulator using the side-accumulation method or ring-accumulation method can be used as the accumulator 22.

Figure 9:
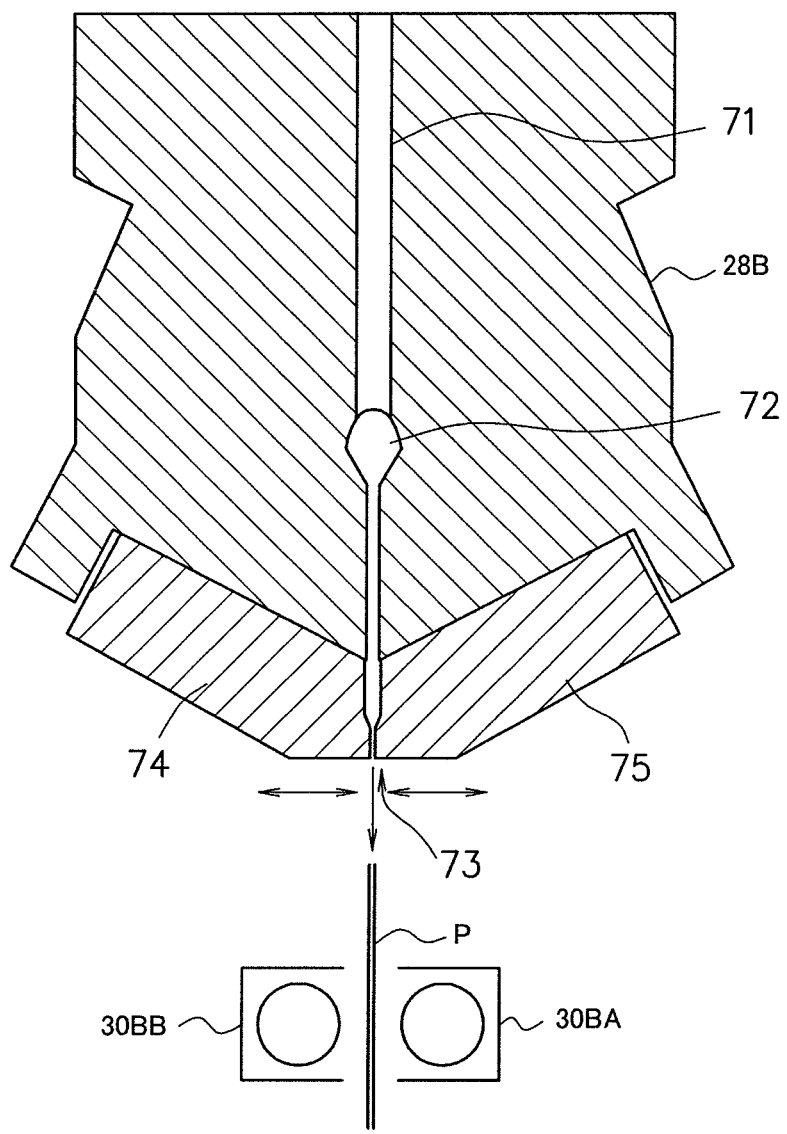
FIG. 9 shows a structural example of the T-Die configuring the molding apparatus and a structural example of the single manifold method.

Moreover, the structure illustrated in FIG. 9 is also acceptable for the first T-Die 28A and the second T-Die 28B, as illustrated in FIG. 1 or FIG. 8. For example, when the second T-Die 28B is of the structure illustrated in FIG. 9, the thermoplastic foamed resin supplied from the second accumulator 22B is introduced and guided to a duct 71, and widens in the direction of the die width while flowing in a manifold 72. Next, the thermoplastic foamed resin heads toward a slit 73, through the downstream resin duct of the manifold 72. Consequently, the thermoplastic foamed resin sheet P is suspended, between the pair of the split mold block 32A and the split mold block 32B, from the slit 73.

Moreover, the structure illustrated in FIG. 9 has gating mechanisms 74 and 75 to control the gating of the slit 73. Sliding the gating mechanisms 74 and 75 sideways will open or close the slit 73. Normally, closing of the outlet of the accumulation chamber of the accumulator 22A (22B) allows storing of the molten resin in the concerned accumulation chamber. Due to this, resin pressure in the accumulation chamber can be increased. On the other hand, in the structure illustrated in FIG. 9, while increasing resin pressure, the tip of the T-Die is closed with a connected state of the accumulation chamber and the duct within the T-Die. This allows the pressure of the resin stored in the accumulation chamber and the duct within the T-Die to be increased. In other words, pressure of the molten resin up to the outlet of the T-Die 28A (28B) can be increased by closing the slit 73 using the gating mechanisms 74 and 75. Next, when the internal pressure of the T-Die 28A (28B) increases to a specific value, the slit 73 is opened with the gating mechanisms 74 and 75. Due to this, the thermoplastic foamed resin sheet P is suspended from the slit 73, between the pair of the split mold block 32A and the split mold block 32B. In this way, the internal pressure within the T-Die 28A (28B) can be increased in this structure. Therefore, expansion of the thermoplastic foamed resin sheet P can be prevented until the thermoplastic foamed resin sheet P is extruded from the T-Die 28A (28B). The thermoplastic foamed resin sheet P can expand once the thermoplastic foamed resin sheet P is extruded from the T-Die 28A (28B). Additionally, as long as the gating of the slit 73 is possible, any configuration or control method is acceptable for the configuration and control method of the gating mechanisms 74 and 75. Also, a choke bar (not illustrated) may also be mounted downstream in the resin duct of the manifold 72. In this structure, the flow rate and thickness of the thermoplastic foamed resin in its width direction can be adjusted by the choke bar.

Figure 10:
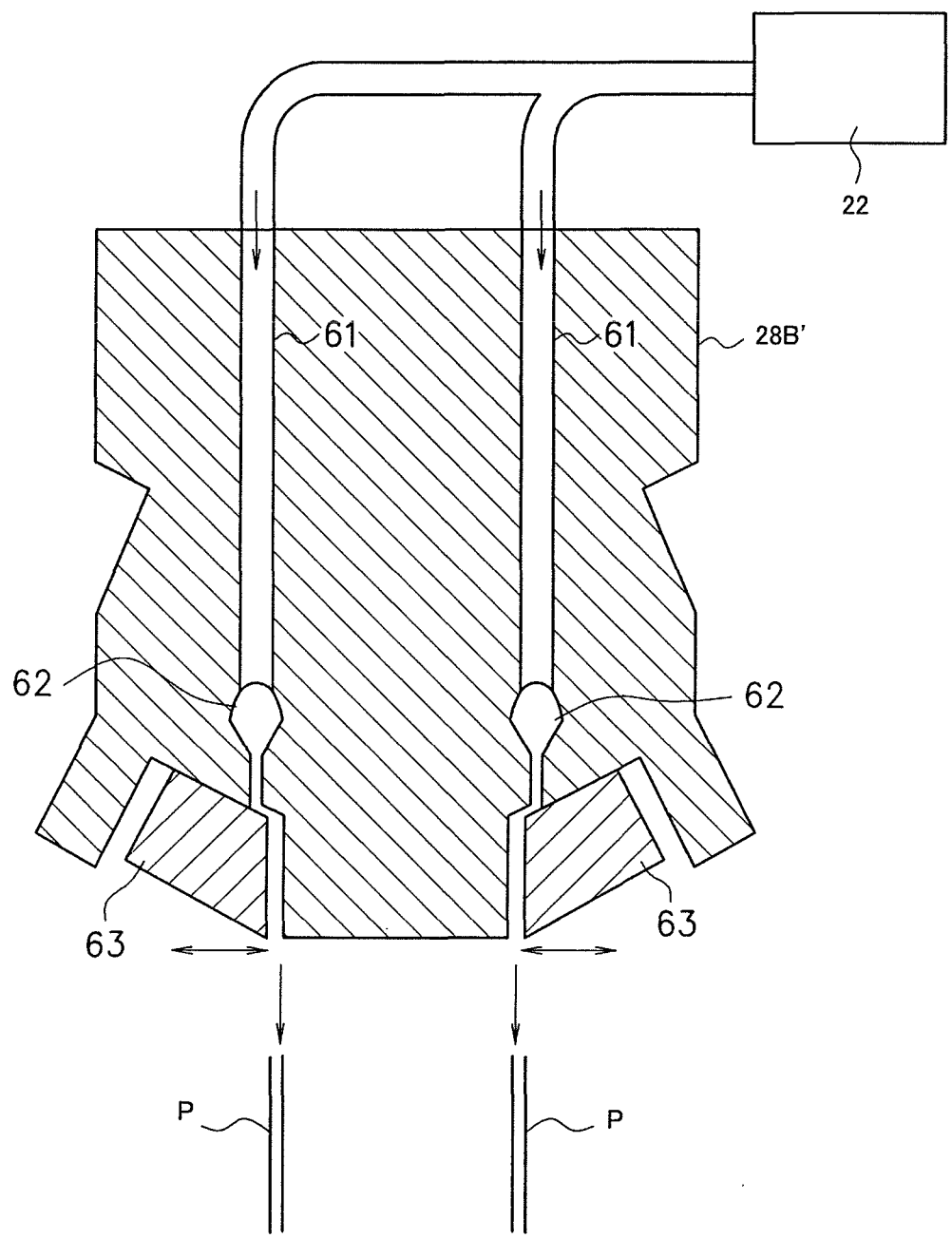
FIG. 10 shows a structural example of the T-Die configuring the molding apparatus and a structural example of the multi-manifold method.

Moreover, the two thermoplastic foamed resin sheets P are suspended between the pair of the split mold blocks 32A and 32B in the molding apparatus 100 illustrated in FIG. 1 or FIG. 8, with the two T-Dies 28A and 28B using the single manifold method. However, it is also possible to suspend the two thermoplastic foamed resin sheets P between the pair of the split mold block 32A and the split mold block 32B using a single T-Die 28B' using the multiple manifold method illustrated in FIG. 10. In the T-Die 28B' illustrated in FIG. 10, the thermoplastic foamed resin supplied from the accumulator 22 is introduced and guided into the two ducts 61 and 61. The thermoplastic foamed resin flows through each manifold 62 and 62, and spreads along the width of the die. Choke bars 63 and 63 are set downstream in the manifolds 62 and 62. The flow rate in width and the thickness of the thermoplastic foamed resin can be adjusted with this choke bar 63. This enables two thermoplastic foamed resin sheets P to be suspended between the pair of the split mold block 32A and the split mold block 32B, from the T-Die 28B' illustrated in FIG. 10. Moreover, the internal pressure of the T-Die 28B' can be increased by closing the resin duct using the choke bars 63 and 63. Since this allows an increase in internal pressure of the T-Die 28B', the expansion of the thermoplastic foamed resin sheet P can be prevented until the thermoplastic foamed resin sheet P is extruded from the T-Die 28B'. The thermoplastic foamed resin sheet P can expand, once the thermoplastic foamed resin sheet P is extruded from the T-Die 28B'.

Moreover, in the molding apparatus 100 illustrated in FIG. 1 or FIG. 8, the first pair of rollers 30AA and 30AB, and the second pair of rollers 30BB and 30BA adjust the thickness of the thermoplastic foamed resin sheet P. However, these pairs of rollers are not indispensable.

When the thermoplastic foamed resin sheet P is compressed by the pair of rollers, the air cells in the thermoplastic foamed resin sheet P may burst. Therefore, in a structure without a pair of rollers, since the air cells in the thermoplastic foamed resin sheet P do not burst, the expansion ratio of the thermoplastic foamed resin sheet P can be increased.

The polypropylene type resin, available for use in molding of the climate control duct 18 in the present embodiment, is preferably polypropylene having a melt tension within the range of 30 to 350 mN at 230° C. Especially, the polypropylene type resin preferably is a polypropylene homopolymer having a long chain branching structure, and the one with additives of ethylene-propylene block copolymer is even better.

Moreover, hydrogenated styrene thermoplastic elastomer may also be added to the polypropylene type resin. In such a case, in order to maintain stiffness and improve impact-resistance of the climate control duct 18, styrene thermoplastic elastomer is added to the polypropylene type resin at 5 to 40 wt %, preferably within the range of 15 to 30 wt %.

The styrene thermoplastic elastomer used, specifically, is a hydrogenated polymer of styrene-butadiene-styrene block copolymer, styrene-isoprene-styrene block copolymer, and styrene-butadiene random copolymers. Moreover, when using a hydrogenated styrene thermoplastic elastomer, the styrene content is less than 30 wt %, preferably less than 20 wt %. The MFR (measured under the testing temperature of 230° C., and a testing load of 2.16 kg, in accordance with JIS K-7210) of the hydrogenated styrene thermoplastic elastomer at 230° C., is 10 g/10 minutes or less, preferably 5.0 g/10 minutes or less and 1.0 g/10 minutes or more.

Moreover, the polyolefin polymer added to the polypropylene type resin is preferably a low density ethylene-α-olefin, with a preferred compounding ratio within the range of 1 to 20 wt %. The low density ethylene-α-olefin preferably should have a density of 0.91 g/cm³ or less. A suitable low density ethylene-α-olefin is the ethylene-α-olefin copolymer obtained by copolymerizing α-olefin having 3 to 20 carbon atoms, with ethylene. Some examples are propylene, 1-butane, 1-pentene, 1-hexene, 1-heptene, 1-octene, 1-nonene, 1-decene, 1-dodecene, 4-methyl-1-pentene, 4-methyl-1-hexene, and 1-butane, 1-hexane, and 1-octene are preferred. Moreover, α-olefin with 3 to 20 carbon atoms as mentioned above can be used independently, and also in combinations of two or more types. The content of the monomer unit based on ethylene of the ethylene-α-olefin copolymer, in relation to the ethylene-α-olefin copolymer, is within the range of 50 to 99 wt %. Moreover, the content of the monomer unit based on α-olefin is in the range of 1 to 50 wt %, in relation to the ethylene-α-olefin copolymer. Specifically, use of linear very-low density polyethylene, ethylene elastomer, or propylene elastomer, polymerized using a metallocene catalyst, is preferred.

The material of the thermoplastic foamed resin sheet P, suspended between the pair of the split mold block 32A and the split mold block 32B, needs to have a high melting tension. Not only does this prevent variances in the wall thickness of the resin sheet P caused by draw-down or necking-in, but can also increase the expansion ratio. For this reason, the climate control duct 18 is produced with excellent lightweight and insulation properties.

In particular, the MFR of the resin sheet P at 230° C. (measured under the testing temperature of 230° C., and a testing load of 2.16 kg in accordance with JIS K-7210), is preferably 5.0 g/10 minutes or less, more preferably 1.5 to 3.0 g/10 minutes. Now generally, the MFR at 230° C. (measured under the testing temperature of 230° C., and a testing load of 2.16 kg, in accordance with JIS K-7210) of resin materials used in shaping films and the like through extrusion from a T-Die, is greater than 3.0 g/10 minutes, specifically 5.0 to 10.0 g/10 minutes.

Moreover, it is also possible to use a blended resin as the material of the resin sheet P for molding the climate control duct 18 in the present embodiment, where a long chain branch structured polypropylene (mentioned hereafter as long chained PP) and a polyethylene resin containing a high density polyethylene with a long chain branch structure (mentioned hereafter as long chained HDPE) are blended.

Also, the polyethylene resin containing the long chained HDPE may contain only the long chained HDPE, or may also be a blended material of the long chained HDPE with other polyethylene type resins. For example, polyethylene (low density polyethylene, medium density polyethylene or the like) with a density of 0.94 g/cm³ or less, may be blended in the long chained HDPE.

Molding the climate control duct 18 using the above mentioned resin blend, results in a high expansion form of the climate control duct 18.

Moreover, from the perspective of increasing the expansion ratio, it is preferred that the long chained PP be a propylene homopolymer (homo PP) with a weighted average branching index of 0.9 or less. Also, the weighted average branching index is represented by $v1/v2$ where $v1$ is the viscosity limit value of the branched polyolefin, and $v2$ is the viscosity limit value of the linear polyolefin having the same weight-average molecular weight as the branched polyolefin.

Again, from the perspective of increasing the expansion ratio, it is preferred that the long chained HDPE be an ethylene homopolymer (homo PE) with a melt tension (MT) at 230° C. of 30 mN or more.

Moreover, from the perspective of maintaining stiffness while increasing de-burring performance, a high density polyethylene (density of 0.94 g/cm³ or more) of a non-long chained branching structure can be used as the polyethylene other than the long chained HDPE, to be blended in the resin blend. Further, in order to increase impact resistance in low temperatures, a polyethylene with a density of 0.91 g/cm³ or less may also be used. In this case, it is especially preferred that a very-low density linear polyethylene, polymerized by a metallocene catalyst, be used.

Moreover, it is preferred that several resins be blended in the resin blend, to have a melt tension (MT) at 230° C. of 30 to 350 mN. Here, MT refers to the melting tension. If the MT of the resin blend is within the range of 30 to 350 mN, a high expansion ratio can be obtained. In addition to this, MT is the tension measured by using the "melt tension tester" (manufactured by Toyo Seiki Seisaku-sho Ltd). In this measurement, the pre-heating temperature is 230° C. and the extrusion speed is 5.7 mm/minute, and the strand is extruded from an orifice measuring 2.095 mm in diameter and 8 mm in length. This strand is wound at a winding speed of 100 rpm, onto a roller of 50 mm diameter. The MT is measured as the strand tension during this winding.

Moreover, the melt flow rate (MFR) at 230° C. of the resin blend is preferably 1 to 10 g/10 minutes. Here, the MFR refers to the value measured according to JIS K-7210. When compared to when the MFR is within the range of 1 to 10 g/10 minutes, if the MFR is less than 1 g/10 minutes, it tends to become more difficult to increase the extrusion speed. When compared to when the MFR is within the range of 1 to 10 g/10 minutes, if the MFR exceeds 10 g/10 minutes, molding tends to be more difficult due to draw-down occurring.

Moreover, the expansion ratio can be increased by shaping a foamed molding using a resin blend containing 5 to 40 wt % of thermoplastic elastomer. In this case, for example, styrene elastomer, ethylene propylene rubber (mentioned hereafter as EPR), and olefin block copolymer (mentioned hereafter as OBC) can be used as the thermoplastic elastomer.

As a styrene elastomer, it is possible to use an elastomer having a styrene unit with hydrogen added within molecules. For example, it is possible to use hydrogenated elastomers such as styrene-ethylene-butylene-styrene block copolymer (mentioned hereafter as SEBS), styrene-ethylene-propylene-styrene block copolymer, and styrene-butadiene random copolymers.

Moreover, by molding the climate control duct 18 using a resin blend containing 5 to 20 wt % of OBC (olefin block polymer), the expansion ratio can be increased approximately 4.0 times or more. Note that the OBC is a product in which the two types of polyolefins are alternately shaped into blocks within a single molecule, through a catalyst system involving two types of catalysts.

As a foaming agent, inorganic physical foaming agents such as air, carbon dioxide, nitrogen gas, and water, and organic physical foaming agents such as butane, pentane, hexane, dichloromethane, and dichloroethane, chemical foaming agents such as sodium bicarbonate, citric acid, sodium citrate, and azodicarbonamide (mentioned hereafter as ADCA), or in addition to this, a combination of these physical foaming agents and chemical foaming agents, can be used as the foaming agent.

Especially, using a chemical foaming agent that produces a carbon dioxide gas, such as carbon dioxide, sodium bicarbonate, citric acid, or sodium citrate as a foaming agent, can control shark-skin from occurring. This then creates a clean surface on the foamed molding. Here, shark-skin refers to the irregularities on the surface of the molded product due to the uneven flow of the molten resin from the die slits.

Moreover, the chemical foaming agent plays a core role in the foaming of the physical foaming agent, when a combination of carbon dioxide as a physical foaming agent, and a chemical foaming agent generating carbon dioxide, is used. This enables fine dispersion of air cells. Thus, the strength of the foamed molding can be increased, while improving de-burring performance.

Moreover, when mixing a physical foaming agent into the resin blend, it is preferable to mix the physical foaming agent as a supercritical fluid into the resin blend. Especially, it is preferable to mix carbon dioxide or nitrogen gas in its supercritical state, into the resin blend. In this case, uniform and assured foaming is obtained. Moreover, for nitrogen, the supercritical fluid state of nitrogen can be obtained by setting the critical temperature at −149.1° C., and critical pressure of 3.4 MPa or more. The supercritical fluid state of carbon dioxide is obtained by a critical temperature of 31° C., and critical pressure of 7.4 MPa or more.

<Operation/Effect of the Molding Method of the Climate Control Duct 18 in the Present Embodiment>

In this way, in the molding method of the climate control duct 18 in the present embodiment, the thermoplastic foamed resin mixed with a foaming agent and supplied from the cylinder 18A (18B), as shown in FIG. 1, is accumulated in the accumulator 22A (22B). This thermoplastic foamed resin is supplied to the T-Die 28A (28B) at fixed intervals using the plunger 24A (24B). A pair of the thermoplastic foamed resin sheets P in a molten state containing air cells, is extruded from the T-Dies 28A and 28B. This pair of thermoplastic foamed resin sheets P is placed between the pair of the split mold block 32A and the split mold block 32B. Then, as shown in FIG. 2, air is sucked by the suction part (not shown) provided in the frame 33A (33B) that is located around the split mold block 32A (32B). Thus, the thermoplastic foamed resin sheet P is attached firmly onto the frame 33A (33B). As a result, the thermoplastic foamed resin sheet P is attached firmly to the frame 33A (33B). Next, as shown in FIG. 3, the thermoplastic foamed resin sheet P is adsorbed by a vacuum onto the cavity surface 116A (116B) of the split mold block 32A (32B). Moreover, as shown in FIG. 4, the split mold block 32A and the split mold block 32B are closed. Thus, the climate control duct 18 is molded. After that, as shown in FIG. 5, the pair of the split mold blocks 32A and 32B are separated from the climate control duct 18, and the climate control duct 18 is removed.

In this way, in the molding method of the duct in the present embodiment, the thermoplastic foamed resin sheet P is adsorbed onto the frame 33A (33B) by sucking air with the suction part (not shown) provided in the frame 33A (33B). Therefore, the thermoplastic foamed resin sheet P is attached firmly onto the frame 33A (33B). Thus, the frame 33A (33B) can make secure contact with the thermoplastic foamed resin sheet P.

Also, in the molding method of the duct in the present embodiment, a pair of molten thermoplastic foamed resin sheets P is placed between the pair of the split mold blocks 32A and 32B. After that, the split mold block 32A and the split mold block 32B are closed and the duct is molded. Thus, the adhesion of the two thermoplastic foamed resin sheets P can be improved.

EXAMPLES

Next, specific examples, related to an example of the molding method of the climate control duct 18 mentioned above are explained. However, the following Examples are only some examples, and the technical concepts of the present embodiment are not limited to these following examples.

FIG. 11 shows (1) the material compound ratio of the resin blend, and (2) the expansion ratio of the molded foaming ducts, regarding Examples 1 through 5.

The resins A to C shown in FIG. 11 and the following Examples correspond to the following resins.

Resin A: Long chained HDPE (homopolymer), "08S55A" made by Tosoh Corporation

Resin B: Long chained PP (homopolymer), "WB140" made by Borealis Inc.

Resin C: OBC, "OBC9000" made by the Dow Chemical Company

Example 1

A foamed resin was made by taking carbonic acid gas in its supercritical state as the foaming agent, talc master batch (1.5 parts by weight) as the nucleating agent, and carbon black master batch (1.5 parts by weight) as the coloring agent, and adding them to the resin blend (100 parts by weight) obtained by mixing Resin A and Resin B at a ratio of 50:50. This was extruded between the split mold block 32A and the split mold block 32B as two thermoplastic foamed resin sheets P. The split mold block 32A and the split mold block 32B were closed, bonding and thermally fusing the two thermoplastic foamed resin sheets P. This forms the molding of the climate control duct 18. As shown in FIG. 11, the expansion ratio of the molded climate control duct 18 was 2.9 times.

Example 2

The procedures in Example 2 were the same as the procedures in Example 1, except that the resin blend used was obtained by mixing Resin A, Resin B, and Resin C in a ratio of 50:45:5. As shown in FIG. 11, the expansion ratio of the molded foamed duct was 4.2 times.

Example 3

The procedures in Example 3 were the same as the procedures in Example 1, except that the resin blend used was obtained by mixing Resin A, Resin B, and Resin C in a ratio of 50:40:10. As shown in FIG. 11, the expansion ratio of the molded foamed duct was 4.7 times.

Example 4

The procedures in Example 4 were the same as the procedures in Example 1, except that the resin blend used was obtained by mixing Resin A, Resin B, and Resin C in a ratio of 50:30:20. As shown in FIG. 11, the expansion ratio of the molded foamed duct was 4.0 times.

Example 5

The procedures in Example 5 were the same as the procedures in Example 1, except that the resin blend used was obtained by mixing Resin A, Resin B, and Resin C in a ratio of 50:10:40. As shown in FIG. 11, the expansion ratio of the molded foamed duct was 3.7 times.

Example 1 is a foamed resin blend with a polyethylene type resin including high density polyethylene (Resin A) of long chained branching structures at 50 wt %, and polypropylene (Resin B) of long chained branching structures at 50 wt %. The expansion ratio of such foamed resin blend will be higher than that of a resin blend in which only polypropylene (Resin B) with long chained branching structures is foamed.

Moreover, according to Examples 2 through 5, blending of the OBC as a thermoplastic elastomer at 5 to 40 wt % can cause improvements in the expansion ratio, when compared to the blending of other thermoplastic elastomers.

Especially, according to Examples 2 to 4, blending OBC at 5 to 20 wt % is preferable as it causes an increase of the expansion ratio (4.0 times or higher). What is even better, is to have OBC at around 10 wt % (8 to 12 wt %). Consequently, the climate control duct 18 with high expansion ratios approximately between 4.2 to 4.7 times can be obtained.

Moreover, the climate control duct 18 with an expansion ratio of 4.0 times or more can easily be obtained by foamed molding of a resin blend produced to have compounds of the long chained HDPE (homopolymer) at 40 to 60 wt %, compounds of the long chained PP (homopolymer) at 30 to 45 wt %, and compounds of OBC at 5 to 15 wt % (long chained HDPE, long chained PP, and OBC to total 100 wt %).

Moreover, the application of the climate control duct 18 in the present embodiment is not limited to automobiles. Appropriately changing the design of the climate control duct 18 will allow for application of the climate control duct 18 in carriers such as trains, ships and airplanes. The climate control duct 18 in the present embodiment is light-weight while having a certain degree of strength, and is able to be manufactured at a low cost. Therefore, use of this climate control duct 18 can reduce the cost of carriers as well as increasing fuel efficiency thereof.

Moreover, it is also possible to insert and mold the duct by placing a fin to control wind direction, between the pair of sheets P extruded from the extruding machine 12. With this, a duct having internal fins can be molded. In this procedure, a wider cross sectional area of the air passage can be secured by blow molding ribs controlling wind direction integrally with the duct, when compared to the procedure of molding ducts with unchanging contours. Due to this, drops in pressure can be controlled.

Also, in the production method of the present embodiment mentioned above, the resin sheet P is extruded downward from the T-Die 28A (28B) positioned above the split mold block 32A (32B). Next, the resin sheet P is compressed between the split mold block 32A and the split mold block 32B. A mechanism to maintain the resin sheet P becomes unnecessary with such method. Thus, the manufacturing device can be simplified. In other words, for example, a procedure where the resin sheet P is extruded horizontally from the T-Die 28A (28B) can also be considered. After that, the sheet P is compressed from top and bottom by the split mold block 32A and the split mold block 32B. However, under such method, a mechanism to control slacking of the sheet P, while placing the sheet P between the split mold block 32A and the split mold block 32B, would be necessary. On the other hand, in the production method of the present embodiment mentioned above, the resin sheet P extruded from the extruding machine 12 is placed between the split mold block 32A and the split mold block 32B while its own weight prevents deflection. Thus, it is possible to mold a duct with a simple mechanism.

Moreover, in the method of the present embodiment mentioned above, the thermoplastic foamed resin sheet P is adsorbed and retained by the frame 33A (33B). Therefore, a closed space can accurately be formed between the thermoplastic foamed resin sheet P and the cavity surface 116A (116B) of the split mold block 32A (32B). Therefore, by sucking the sheet P from the cavity surface 116A (116B), the shape of the cavity surface can be reflected in the sheet P more accurately.

Second Embodiment

The second embodiment is explained as follows.
<An Overview of the Molding Apparatus 1 in the Second Embodiment>

First, an overview of the molding apparatus 1 in the second embodiment is explained with reference to FIGS. 12, 13A, 13B, 13C, and 13D.

The molding apparatus 1 of the present embodiment has the extruding machine 12 and the clamping machine 10. The extruding machine 12 extrudes the molten and mixed thermoplastic resin P in the sheet form. The clamping machine 10 contacts the thermoplastic resin P in the sheet form, extruded from the extruding machine 12, with the frame 33A (33B) which can move relative to the split mold block 32A (32B) and is located around it. After that, the thermoplastic resin P facing the cavity surface 116A (116B) of the split mold block 32A (32B) is adsorbed by a vacuum onto the cavity surface 116A (116B). Thus, the thermoplastic resin P is shaped into the shape according to the cavity surface 116A (116B). Then, the split mold block 32A and the split mold block 32B are closed. Thus, the resin molded product is formed.

Figure 13:
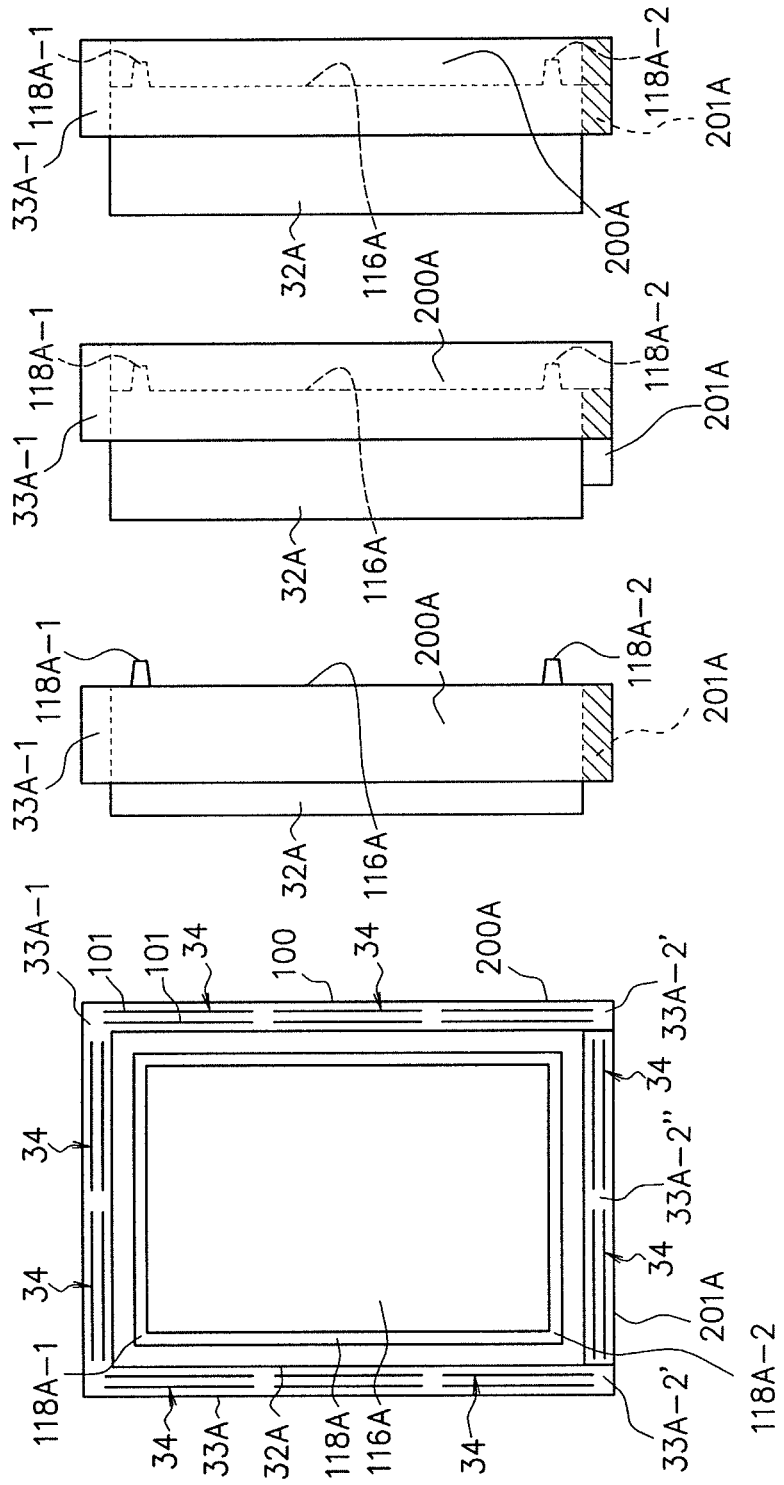
FIGS. 13A, 13B, 13C, and 13D show a configuration example of the split mold blocks and the frames in the second embodiment.

As shown in FIG. 13A, a suction part 34 for sucking the thermoplastic resin P is provided on the contact surface 100, contacting the thermoplastic resin P, of the frame 33A (33B) of the molding apparatus 1 in the present embodiment.

In the molding apparatus 1 of the present embodiment, air is sucked by the suction part 34 provided in the frame 33A (33B). Therefore, the thermoplastic resin P in sheet form, extruded from the extruding machine 12, is adsorbed onto the frame 33A (33B). Thus, the thermoplastic resin P can be attached firmly to the frame 33A (33B). This can prevent the occurrence of gaps between the frame 33A (33B) and the thermoplastic resin P. Thus, the thermoplastic resin P can be shaped into the shape according to the cavity surface 116A (116B). Below, the molding apparatus 1 of the present embodiment is explained in detail with reference to the attached drawings.

<Configuration Example of the Molding Apparatus 1>

First, the configuration example of the molding apparatus 1 in the present embodiment is explained, with reference to FIGS. 12, 13A, 13B, 13C, and 13D.

The molding apparatus 1 of the present embodiment is an apparatus to mold resin molded products, and includes the extruding machine 12 and the clamping machine 10. The molten thermoplastic resin sheet P is extruded from the extruding machine 12 to the clamping machine 10. In the clamping machine 10, two thermoplastic resin sheets P are placed between the split mold block 32A and the split mold block 32B. The resin molded product is molded by closing these mold blocks.

In the frame 33A (33B) of the present embodiment, as shown in FIGS. 13A, 13B, 13C, and 13D, a central part 33A-2" (201A) of a bottom frame 33A-2 (refer to FIG. 12), which configures the lower side of the frame 33A, is separated from the frame 33A. As shown in FIGS. 13B, 13C, and 13D, the central part 33A-2" (201A) of the bottom frame 33A-2, is configured so that it can move independently and separately from the frame 33A.

Therefore, the frame 33A of the present embodiment, as shown in FIGS. 13A, 13B, 13C, and 13D, has the first frame 201A, the second frame 200A, the first frame driving unit (not shown), and the second frame driving unit (not shown). The first frame 201A includes the central part 33A-2" of the bottom frame 33A-2. The second frame 200A is a part other than the first frame 201A of the frame 33A. The first frame driving unit and the second frame driving unit (neither shown) are the units that move the first frame 201A and the second frame 200A independently. The first frame driving unit moves the first frame 201A. The second frame driving unit moves the second frame 200A. Further, the frame 33B has a structure similar to the frame 33A. Moreover, the driving system of the frame driving unit should preferably be hydraulic. Thus, the movement of the frames 200A and 201A can easily be controlled. Further, it is preferable that the frame driving unit be connected to the corresponding central part of the first frame 200A or the second frame 201A. The central parts of the frames 200A and 201A are less susceptible to thermal expansion. Thus, by connecting the frame driving unit to the central part which is less susceptible to thermal expansion, the frame driving unit can move the corresponding frame 200A or 201A in a stable manner, even when the frame 200A or 201A is thermally expanded.

Further, the frame 33A of this present embodiment, as shown in FIGS. 13B, 13C, and 13D, has a square shape surrounding the split mold block 32A. The first frame 201A includes the lower edge of this square. Also, the second frame 200A includes the upper edge as well as the left and right edges of the square merged together. The first frame 201A and the second frame 200A are separate and can be moved independently. Therefore, first, as shown in FIG. 13C, the second frame 200A can be moved by the Second frame driving unit (not shown) and this second frame 200A can be brought into contact with the thermoplastic resin sheet P (not shown). After that, as shown in FIG. 13D, the first frame 201A can be moved by the first frame driving unit (not shown) and this first frame 201A can be brought into contact with the thermoplastic resin sheet P (not shown). As a result, mounting of the corresponding thermoplastic resin sheet P on the first frame 201A, while the thermoplastic resin sheet P is being suspended along the second frame 200A, can be prevented. Thus, resin accumulation at the uppermost end of the central part 33A-2" in the bottom frame 33A-2 can be prevented. Also, the thermoplastic resin sheet P can be suspended down along the U-shaped portion (the second frame 200A). Thus, it is easy to obtain resistance when hanging the thermoplastic resin sheet P downward. This allows the draw-down of the thermoplastic resin sheet P to be controlled.

For example, when the frame 33A with four sides integrally formed is used, there are chances of the central part 33A-2" of the bottom frame 33A-2 being mounted with the lower end of the thermoplastic resin sheet P, when the thermoplastic resin sheet P is suspended along the corresponding frame 33A. Thus, in the molding apparatus 1 of the present embodiment, as shown in FIGS. 13C and 13D, only the second frame 200A is moved and brought into contact with the thermoplastic resin sheet P. After the lower end of the thermoplastic resin sheet P passes through the position of the bottom frame 33A-2, the first frame 201A is moved and brought into contact with the thermoplastic resin sheet P. This prevents the mounting of the part of resin from the thermoplastic resin sheet P on the central part 33A-2" of the bottom frame 33A-2. Thus, mounting of the corresponding thermoplastic resin sheet P on the first frame 201A can be prevented while suspending the thermoplastic resin sheet P along the second frame 200A. Thus, the resin accumulation at the uppermost end of the central part 33A-2" of the bottom frame 33A-2 can be prevented. Also, the thermoplastic resin sheet P can be suspended down along the U-shaped portion (second frame 200A). Thus, it is easy to obtain resistance when hanging the thermoplastic resin sheet P downward. This allows the draw-down of the thermoplastic resin sheet P to be controlled.

Also, the frame 33A, as shown in FIG. 13A, has a suction part 34 on the contact surface 100 to make contact with the thermoplastic resin sheet P. The suction part 34 is a part used to suck air. The thermoplastic resin sheet P is adsorbed onto the frame 33A by the suction of the suction part 34. Due to this, the thermoplastic resin sheet P is attached firmly to the frame 33A. Further, the suction part 34 can be molded to have different shapes (for example circular, elliptical, and polygonal). It is desirable to mold the suction part 34 in a groove shape (linear shape), as shown in FIG. 13A. For example, when the suction part 34 is molded in a porous state (point-like), the thermoplastic resin sheet P is only partly adsorbed onto the contact surface 100. Thus, along the thermoplastic resin sheet P, the parts which are not adsorbed by the suction part 34, may float from the contact surface 100. The thermoplastic resin sheet P can be adsorbed onto the contact surface 100 in a groove shape by molding the suction part 34 in a groove shape (linear shape). Thus, along the thermoplastic resin sheet P, it becomes harder for parts not adsorbed by the suction part 34 to float from the contact surface 100.

<Configuration Example of the Suction Part 34>

Figure 14:
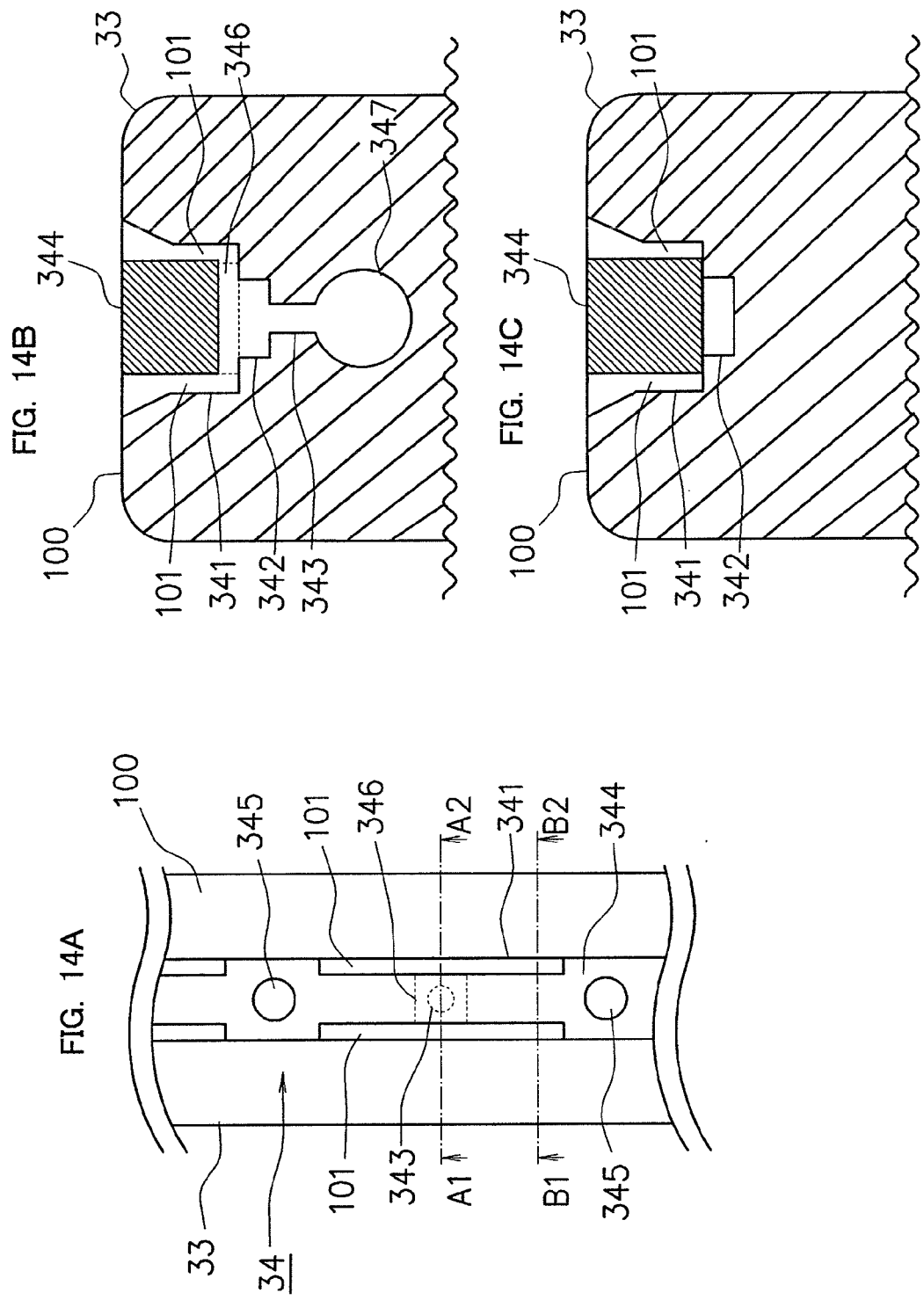
FIGS. 14A, 14B, and 14C are the first figures that show the configuration examples of the suction part.
Figure 15:
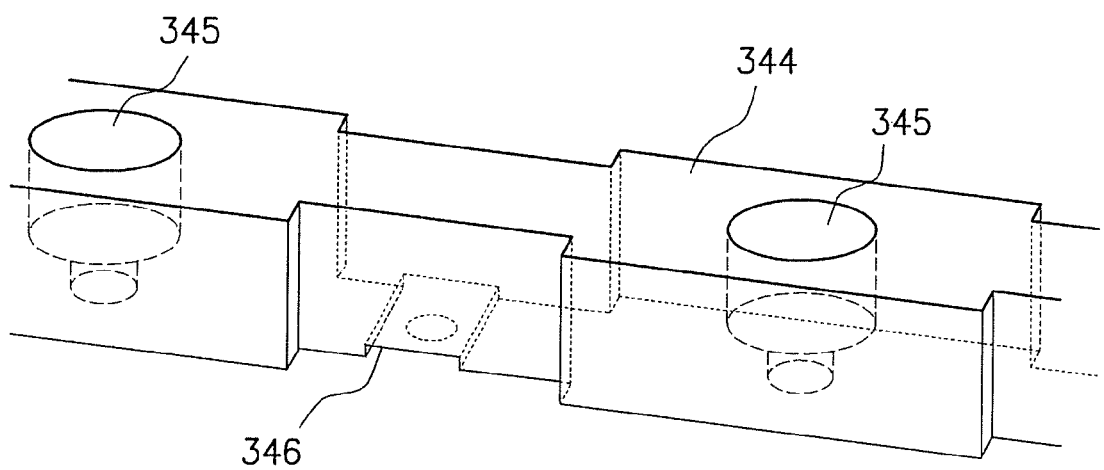
FIG. 15 is the second figure showing the configuration example of the suction part.

Next, the configuration example of the suction part 34 is explained, with reference to FIGS. 14A, 14B, 14C, and 15. FIG. 14A illustrates the example of the upper surface configuration of the suction part 34. FIGS. 14B and 14C show the cross section of the configuration example of the suction part 34. FIG. 15 illustrates the configuration example of a lid member 344 configuring the suction part 34.

Figure 12:
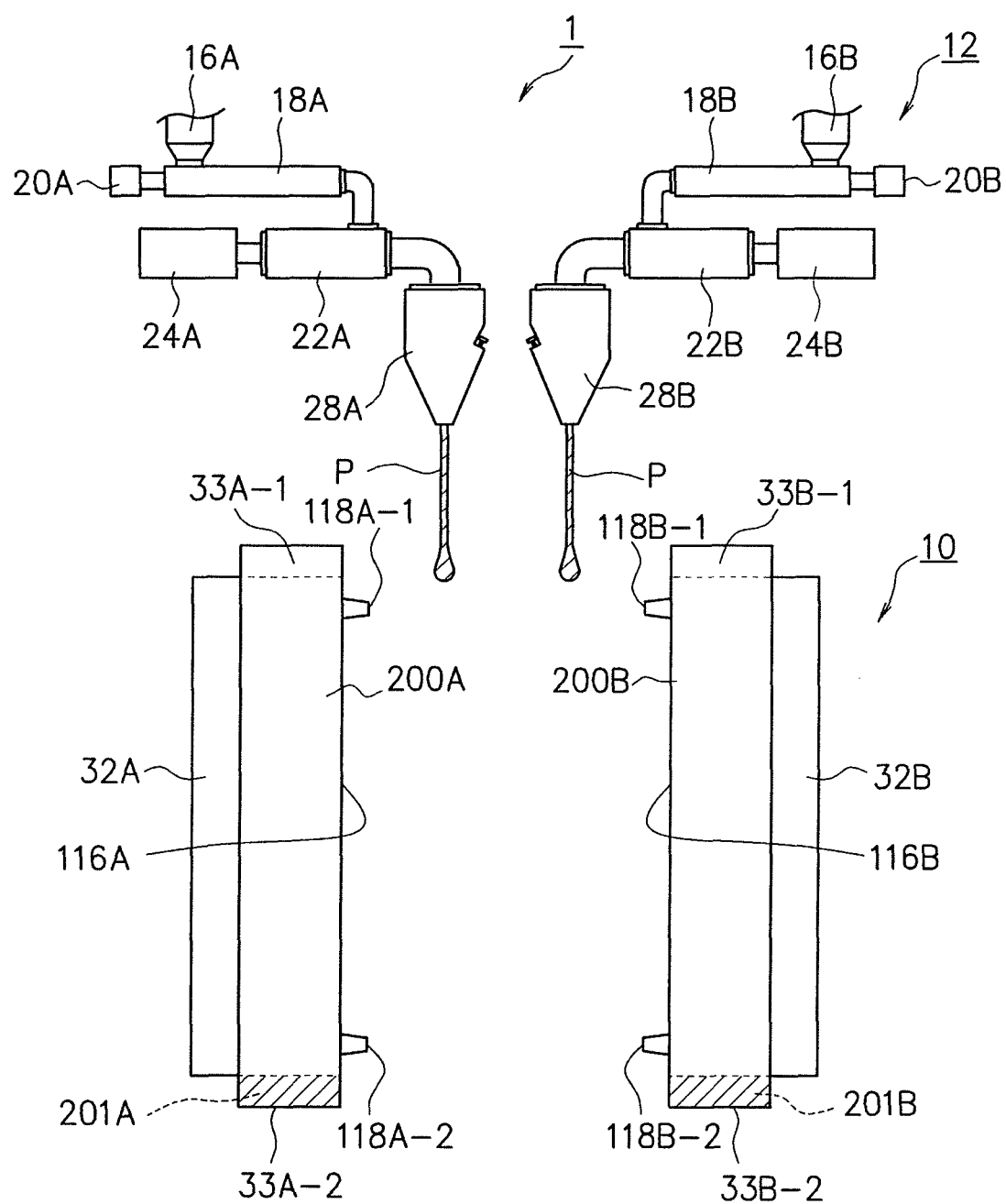
FIG. 12 shows a configuration example of the molding apparatus in a second embodiment.

Further, the frame 33A and the frame 33B shown in FIG. 12 have the same structure. Thus, as shown in FIGS. 14B and 14C, these frames may be represented as frame 33 below.

The suction part 34 of the present embodiment, as shown in FIG. 14A, is provided on the contact surface 100 of the frame 33. As shown in FIG. 14B, the frame 33 includes a first recess 341, a second recess 342, a hole 343 and the lid member 344. The first recess 341 is a part that is recessed inwardly of the contact surface 100. The second recess 342 is a part that is further recessed inwardly of the lower surface of the first recess 341. The hole 343 is an opening formed in part of the bottom surface of the second recess 342. The lid member 344 is arranged on the first recess 341.

The lid member 344 has the shape shown in FIG. 15. The lid member 344 is fitted on the first recess 341. The lid member 344 is fixed onto the bottom surface of the second recess 342 by a bonding member 345 such as screws. The lid member 344 of the present embodiment, as shown in FIG. 15, includes a recess 346 that is recessed inwardly of the part corresponding to the hole 343. FIG. 14B illustrates an example of the cross section configuration of the suction part 34 at the position (position A1-A2) where the recess 346 is set. FIG. 14C illustrates an example of the cross section configuration of the suction part 34 at the position (position B1-B2) where the recess 346 is not set. As shown in FIG. 14B, in the positions where the recess 346 is set, a space is formed between the bottom surface of the first recess 341 and the lid member 344. On the other hand, as shown in FIG. 14C, in the positions where the recess 346 is not set, a space is not formed between the bottom surface of the first recess 341 and the lid member 344. In this position, the bottom surface of the first recess 341 and the lid member 344 come into contact.

In the suction part 34 of the present embodiment, as shown in FIG. 14B, a groove shaped gap 101 (refer to FIG. 14A) is provided between the side wall of the first recess 341 and the side wall of the lid member 344. This gap 101 and the hole 343 communicate with each other through the space formed by the recess 346. Also, the hole 343 communicates with a suction path 347 which can be decompressed. Thus, the suction part 34 can suck the air on the contact surface 100 through the gap 101 and the space formed by the suction path 347, the hole 343, and the recess 346. Thus, the thermoplastic resin sheet P can be adsorbed onto the contact surface 100.

Further, the suction part 34 of the present embodiment can wedge the thermoplastic resin sheet P into the gap 101, while adsorbing the thermoplastic resin sheet P onto the contact surface 100. Thus, it is preferable that the width of the gap 101 be 0.3 mm or more, and more preferably 0.5 mm or more. Thus, the thermoplastic resin sheet P can be wedged into the gap 101. As a result, the thermoplastic resin sheet P can be attached firmly to the contact surface 100.

Also, the suction part 34 of this embodiment, as shown in FIG. 14A, has the groove shaped gap 101 in both ends of the lid member 344. However, it is also possible to provide the groove shaped gap 101 at only one end of the lid member 344. In other words, the suction part 34 of the present embodiment may have multi-columned groove shaped gaps 101 or only one column thereof. However, it is preferable that the suction part 34 have multi-columned groove shaped gaps 101. Thus, the thermoplastic resin sheet P can easily be attached firmly to the contact surface 100.

<Molding Process Example of the Molding Apparatus 1>

Next, an example of the molding process of a resin molded product using the molding apparatus 1 of the present embodiment is explained, with reference to FIGS. 12 and 16 through 20.

First, as shown in FIG. 12, the thermoplastic resin sheet P is extruded from the T-Die 28A (28B). The extruded thermoplastic resin sheet P is suspended between the pair of the split mold block 32A and the split mold block 32B.

Figure 16:
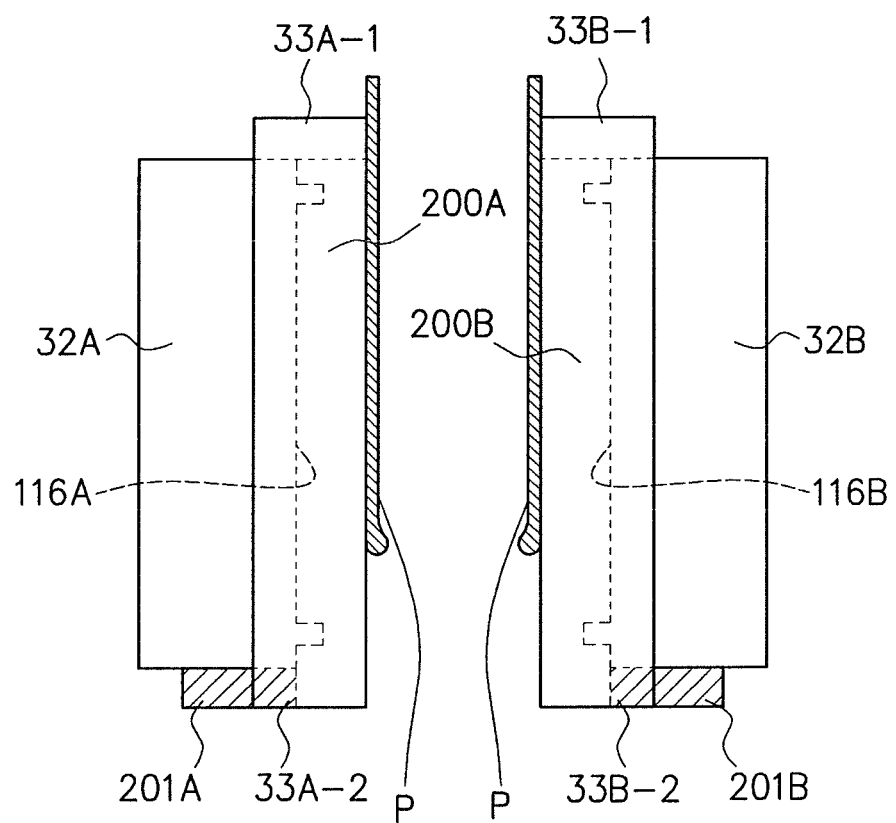
FIG. 16 shows the situation where the second frame comes into contact with the thermoplastic resin sheet extruded from the T-Die in the molding apparatus shown in FIG. 12.

Once the thermoplastic resin sheet P passes the position of a top frame 33A-1 (33B-1) in the frame 33A (33B), as shown in FIG. 16, the second frame 200A (200B) located along the perimeter of the split mold block 32A (32B) is moved toward the thermoplastic resin sheet P. This brings the second frame 200A (200B) into contact with the thermoplastic resin sheet P. Therefore, the thermoplastic resin sheet P suspends downward along the contact surface (side surface geometry) of the second frame 200A (200B).

In such a case, the thermoplastic resin sheet P suspends downward along the contact surface 100 of the second frame 200A (200B). Due to this, friction occurs between the thermoplastic resin sheet P and the contact surface 100. Therefore, the self-weight exerted on the thermoplastic resin sheet P is reduced due to friction. This can control draw-down of the thermoplastic resin sheet P.

Moreover, once the second frame 200A (200B) comes into contact with the thermoplastic resin sheet P, in order to push the thermoplastic resin sheet P with the second frame 200A (200B), it is preferable to move the second frame 200A (200B) forward only by a certain distance. Therefore, the thermoplastic resin sheet P pushed by the second frame 200A (200B) can be suspended downward along the contact surface of the second frame 200A (200B).

Figure 17:
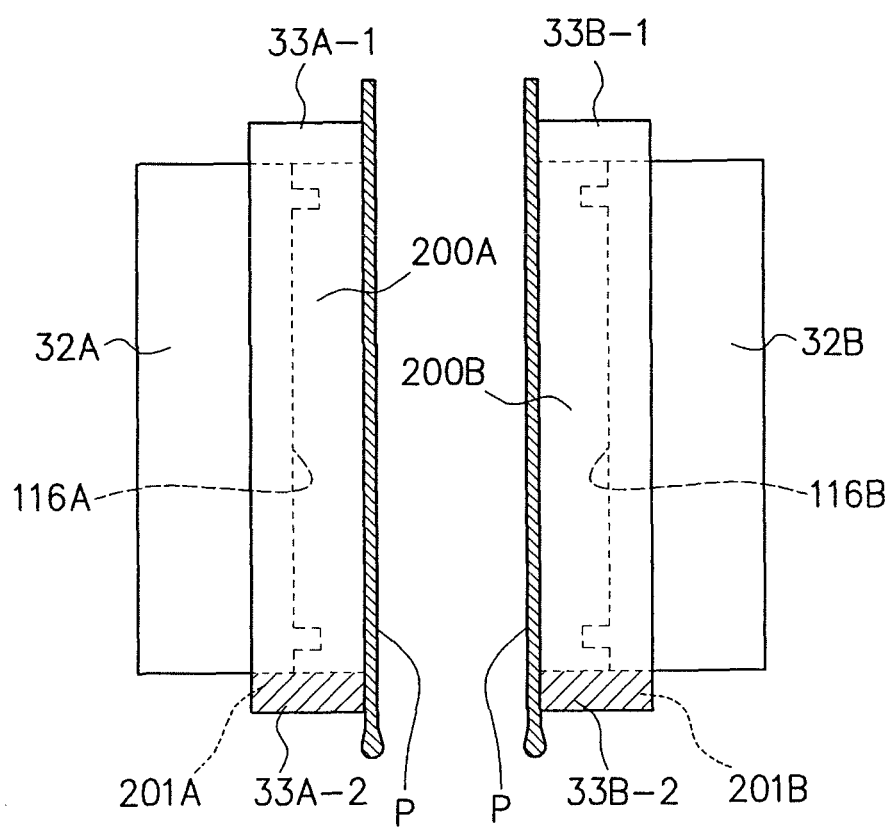
FIG. 17 shows the situation where the first frame comes into contact with the thermoplastic resin sheet, following the situation shown in FIG. 16.

Once the lower end of the thermoplastic resin sheet P passes through the position of the bottom frame 33A-2 (33B-2) in the frame 33A (33B), as shown in FIG. 17, the first frame 201A (201B) is moved toward the thermoplastic resin sheet P. Due to this, the first frame 201A (201B) comes into contact with the thermoplastic resin sheet P. This enables the thermoplastic resin sheet P to make contact with the contact surface 100 along the entire periphery of the frame 33A (33B). Moreover, as shown in FIG. 17, while the first frame 201A (201B) is brought into contact with the thermoplastic resin sheet P, the back end of the first frame 201A (201B) is not positioned further ahead than the cavity surface 116A (116B). Moreover, during this, the first frame 201A (201B) and the split mold block 32A (32B) are overlapped vertically. This can prevent a gap from forming between the first frame 201A (201B) and the split mold block 32A (32B).

After the thermoplastic resin sheet P comes into contact with the contact surface 100 of the entire periphery of the frame 33A (33B), the suction part 34 provided at the contact surface 100 sucks the air. Due to this, the thermoplastic resin sheet P is sucked and can be bonded to the contact surface 100. As a result, a closed space can be formed by the thermoplastic resin sheet P, the frame 33A (33B), and the cavity surface 116A (116B).

Figure 18:
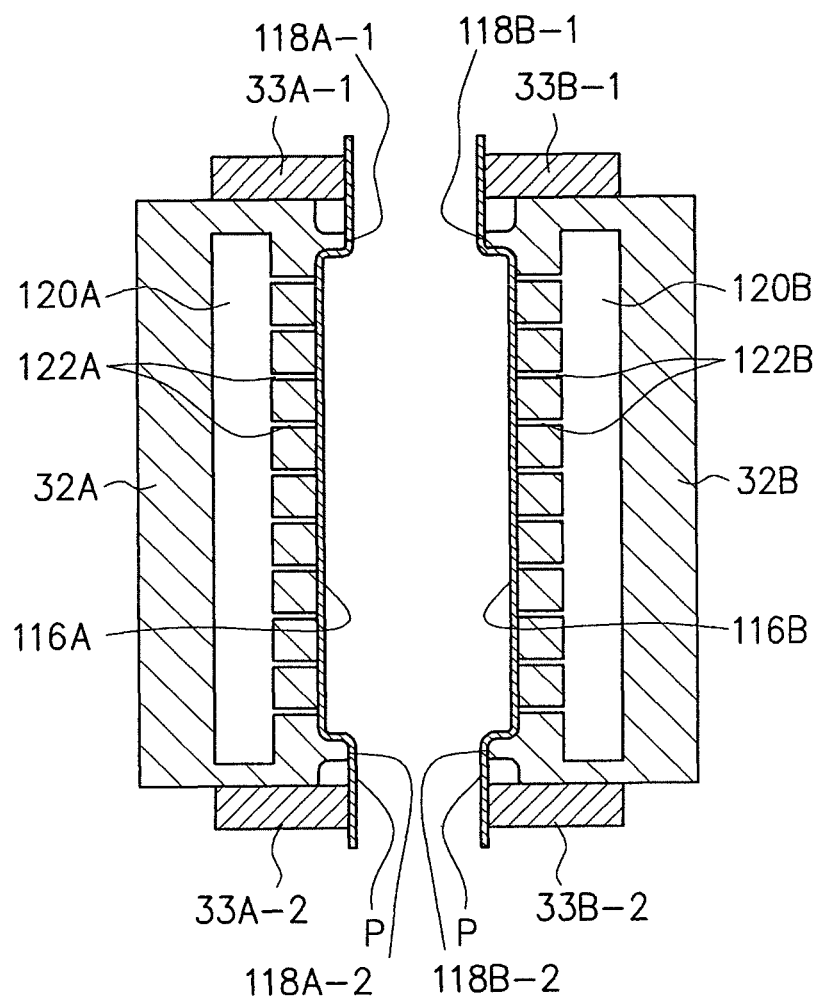
FIG. 18 shows the situation where the thermoplastic resin sheet is adsorbed by a vacuum onto the cavity surface of the split mold block, following the situation shown in FIG. 17.

After the thermoplastic resin sheet P is bonded to the contact surface 100 by the suction part 34 and a closed space is formed, the frame 33A (33B) is moved backward. Due to this, the thermoplastic resin sheet P comes into contact with pinch-off parts 118A-1 (118B-1) and 118A-2 (118B-2). Subsequently, as shown in FIG. 18, a vacuum suction chamber 120A (120B) sucks the air in the closed space through a vacuum suction hole 122A (122B). Thus, the thermoplastic resin sheet P is adsorbed onto the cavity surface 116A (116B). As a result, the thermoplastic resin sheet P is shaped into the shape according to the cavity surface 116A (116B).

Figure 19:
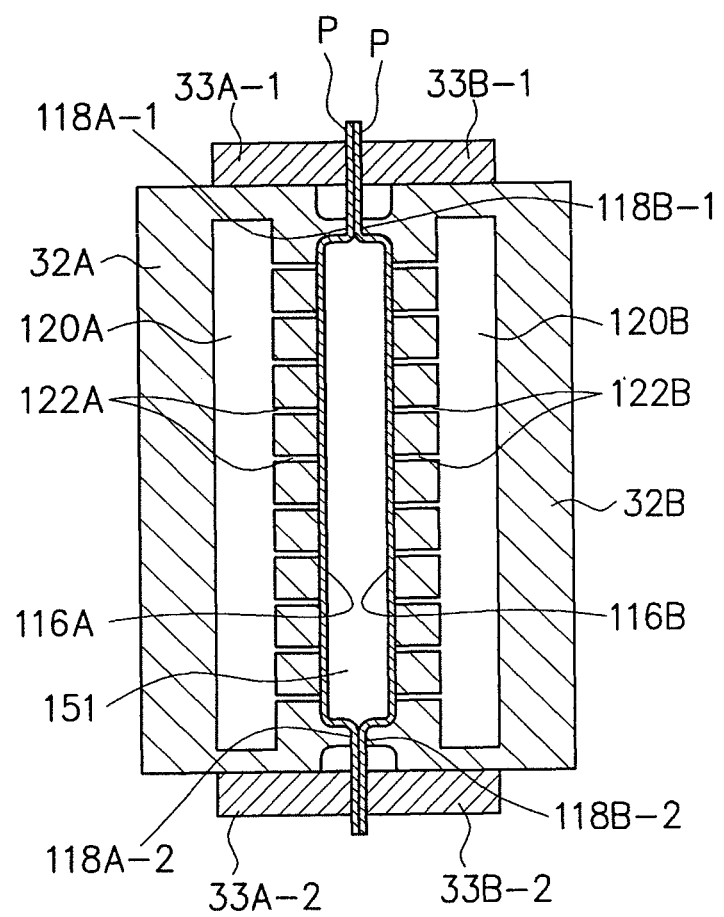
FIG. 19 shows the situation where the split mold blocks are closed, following the situation shown in FIG. 18.

Next, the frame 33A (33B) and the split mold block 32A (32B) are moved forward. Due to this, as shown in FIG. 19, the split mold blocks 32A and 32B move toward each other and are closed. As a result, the pinch-off parts 118A-1 (118B-1) and 118A-2 (118B-2) of the split mold block 32A (32B) weld each rim of the thermoplastic resin sheet P. Therefore, a parting line PL is formed at the contact surface of the two thermoplastic resin sheets P. Moreover, a sealed hollow section 151 is formed inside the two thermoplastic resin sheets P.

Figure 20:
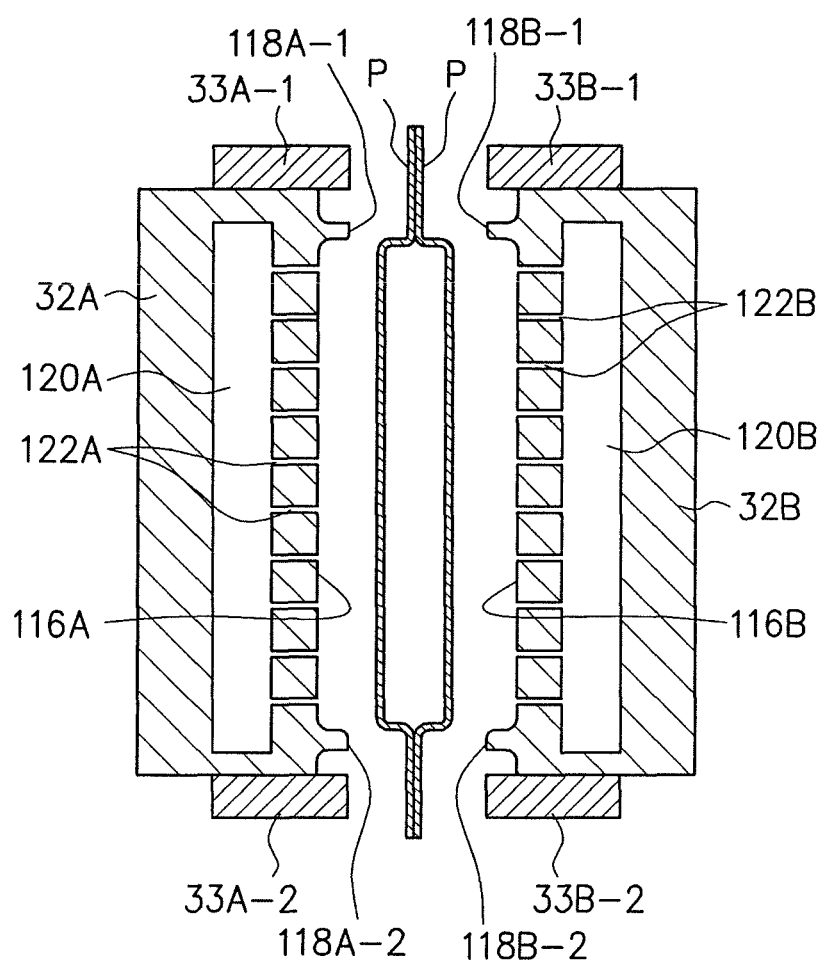
FIG. 20 shows the situation where the split mold blocks are opened, following the situation shown in FIG. 19.

Next, as shown in FIG. 20, the split mold blocks 32A and 32B are opened by moving the split mold blocks 32A and 32B away from each other. Then, burrs on the external parts of the resin molded product are removed, after ejecting the molded product. This completes the molding of the resin molded product.

<Operation/Effect of the Molding Apparatus 1 in the Present Embodiment>

In this way, in the molding apparatus 1 of the present embodiment, the suction part 34 provided in the frame 33A (33B) located along the perimeter of the split mold block 32A (32B) sucks the air. This adsorbs and bonds the thermoplastic resin sheet P extruded from the extruding machine 12 to the frame 33A (33B). Then, the thermoplastic resin sheet P that is facing the cavity surface 116A (116B) of the split mold block 32A (32B) is adsorbed by a vacuum, while it is bonded to the frame 33A (33B). Therefore, the thermoplastic resin sheet P is shaped into the shape according to the cavity surface 116A (116B). Subsequently, a resin molded product is formed by closing the split mold block 32A and the split mold block 32B.

In the molding apparatus 1 of the present embodiment, the thermoplastic resin sheet P extruded from the extruding machine 12 is adsorbed and bonded to the frame 33A (33B) by the sucking of air by the suction part 34 provided in the frame 33A (33B). This can prevent gaps from forming between the frame 33A (33B) and the thermoplastic resin sheet P. Therefore, the thermoplastic resin sheet P can be shaped into the shape according to the surface of the cavity surface 116A (116B).

Moreover, in the molding apparatus 1 of the present embodiment, the frame 33A (33B) that is movable relative to the split mold block 32A (32B) by being positioned in the periphery of the split mold block 32A (32B), is brought into contact with the thermoplastic resin sheet P extruded from the extruding machine 12. Then, the frame 33A (33B) is moved such that the thermoplastic resin sheet P suspends downward as it comes into contact with the frame 33A (33B). Due to this, the thermoplastic resin sheet P extruded from the extruding machine 12 suspends downward while coming into contact with the frame 33A (33B). This produces friction between the thermoplastic resin sheet P and the frame 33A (33B). As a result, the self-weight exerted on the thermoplastic resin sheet P is reduced due to this friction. This can control draw-down of the thermoplastic resin sheet P.

Moreover, the frame 33A (33B) of the present embodiment includes the first frame 201A (201B) and the second frame 200A (200B). The bottom frame (33A-2 (33B-2) configuring the lower side of the frame 33A (33B) is at least included in the first frame 201A (201B). The top frame 33A-1 (33B-1) configuring the upper side of the frame 33A (33B) is at least included in the second frame 200A (200B), which is movable relative to the first frame 201A (201B). In the molding apparatus 1 of the present embodiment, the second frame 200A (200B) is moved closer to the thermoplastic resin sheet P than the first frame 201A (201B). Subsequently, the thermoplastic resin sheet P is suspended downward while being in contact with the second frame 200A (200B). When the lower end of the thermoplastic resin sheet P reaches a point lower than the second frame 200A (200B), the first frame 201A (201B) is moved toward the thermoplastic resin sheet P and brought into contact with the thermoplastic resin sheet P. This can prevent the resin from accumulating at the uppermost end of the central part 33A-2" (33B-2") of the bottom frame 33A-2 (33B-2).

Moreover, in the embodiment mentioned above, a resin molded product is formed using the molding apparatus 1 shown in FIG. 12. However, it is also possible to form a resin molded product by using the molding apparatus 1 having the pair of rollers shown in FIG. 21.

Figure 21:
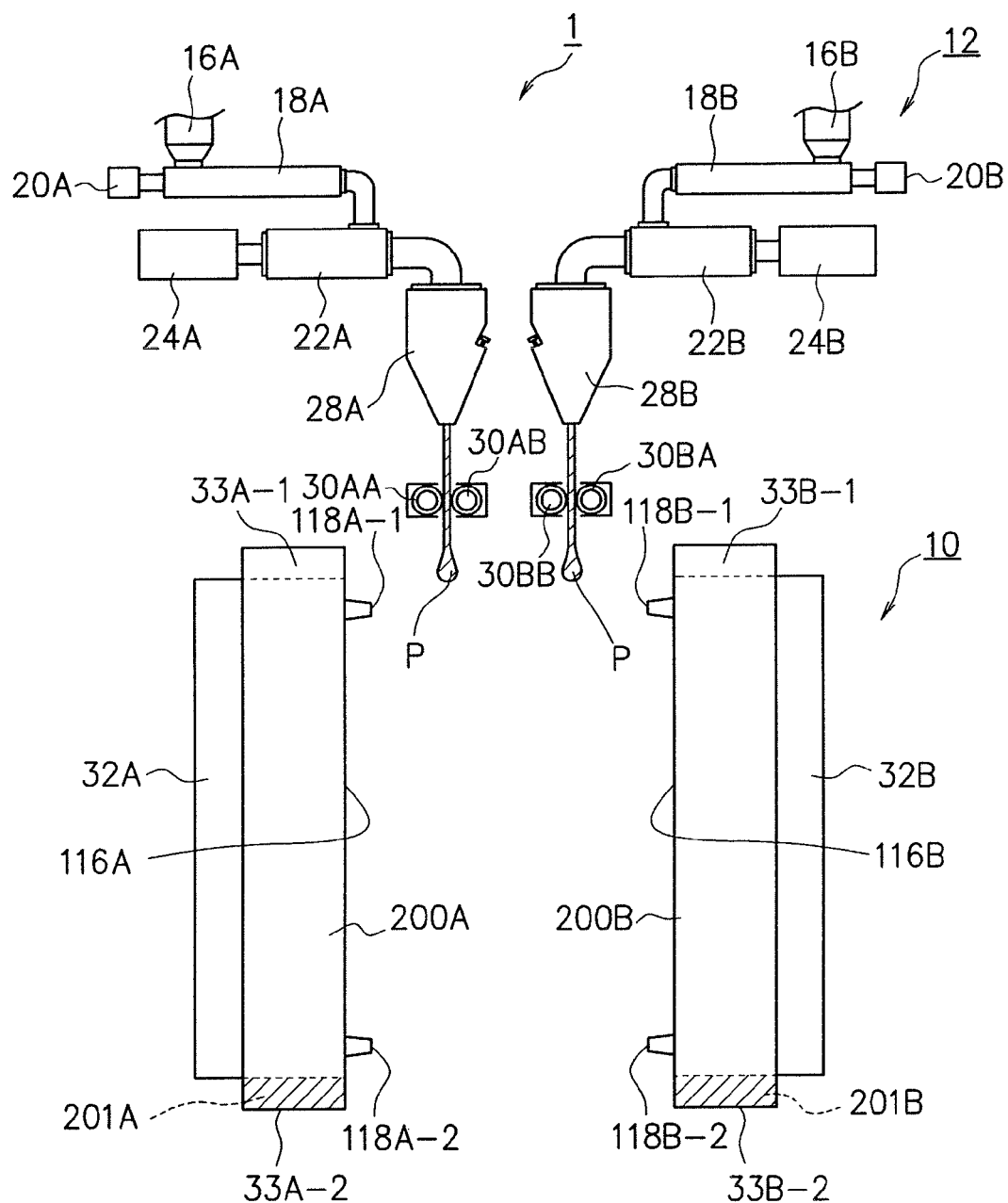
FIG. 21 shows another configuration example of the molding apparatus in the second embodiment.

In the molding apparatus 1 shown in FIG. 21, the thickness of the thermoplastic resin sheet P is adjusted by passing it between the pair of rollers 30AA and 30AB (30BB and 30BA). This can reduce the occurrence of the curtain effect. However, the curtain effect may occur even after passing through this roller pair. Therefore, it is preferable to use the frame 33A (33B) similar to that in the molding apparatus 1 shown in FIG. 12, even when molding the resin molded product using the molding apparatus 1 shown in FIG. 21. This can help the definite forming of a closed space by the thermoplastic resin sheet P, the frame 33A (33B) and the cavity surface 116A (116B). Thus, the vacuum molding can be done stably. Moreover, when molding a resin molded product using the molding apparatus 1 having the roller pair shown in FIG. 21, it also becomes possible to mold a resin molded product with an average wall thickness of 1 mm or less.

Figure 22C:
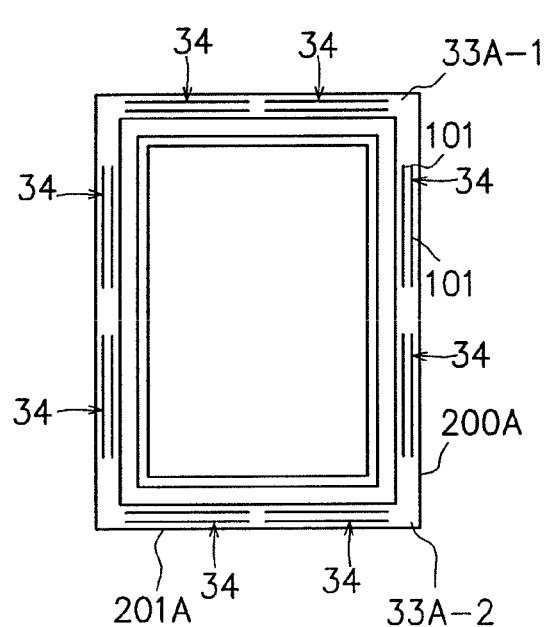
FIGS. 22A, 22B, 22C, and 22D show the configuration example of a groove-shaped gap of the suction part.
Figure 22A:
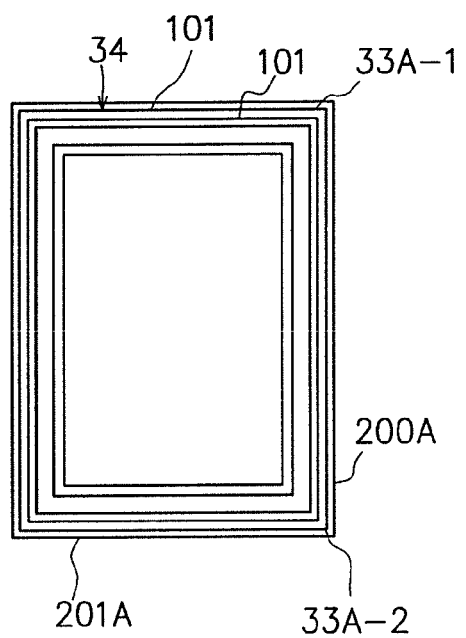
Figure 22D:
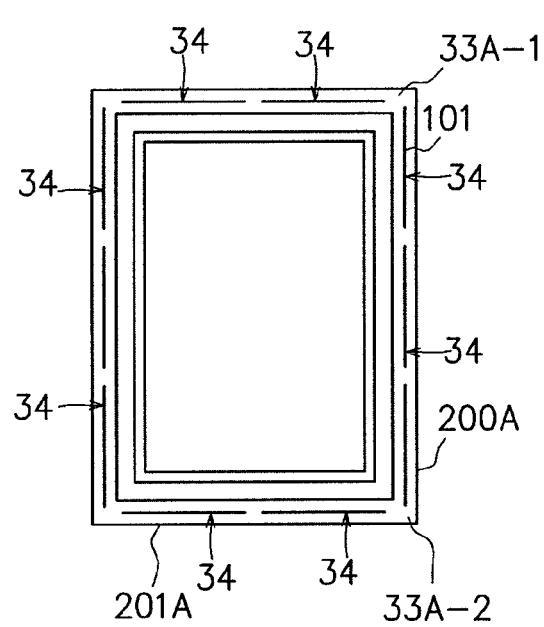
Figure 22B:
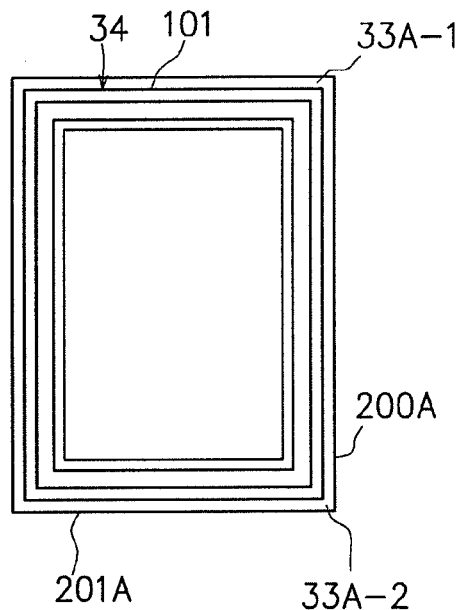

Moreover, in the above mentioned embodiment, the frame 33A (33B), as shown in FIGS. 13A, 13B, 13C, and 13D, is separated into the second frame 200A (200B) and the first frame 201A (201B). Both the frames 200A (200B) and 201A (201B) are set such that they can be moved independently. Also, the suction part 34 is provided on the contact surface 100 of each of the frames 200A (200B) and 201A (201B). However, the frame 33A (33B) may also be set up as a combined unit. It is also possible to provide the suction part 34 on the contact surface 100 of the frame 33A (33B) as the combined unit. In such a case, as shown in FIGS. 22A and 22B, it is also possible to continuously shape the groove shaped gap 101. Moreover, as shown in FIGS. 22C and 22D, it is also possible to intermittently shape the groove shaped gap 101.

Moreover, in the above mentioned embodiment, as shown in FIG. 12, the top frame 33A-1 (33B-1) set at the upper side of the frame 33A (33B) and the bottom frame 33A-2 (33B-2) set at the lower side of the frame 33A (33B) are located on an identical vertical line. Subsequently, the frame 33A (33B) is brought into contact with the thermoplastic resin sheet P extruded from the extruding machine 12. Due to this, the thermoplastic resin sheet P is suspended downward while coming into contact with the frame 33A (33B).

Figure 23:
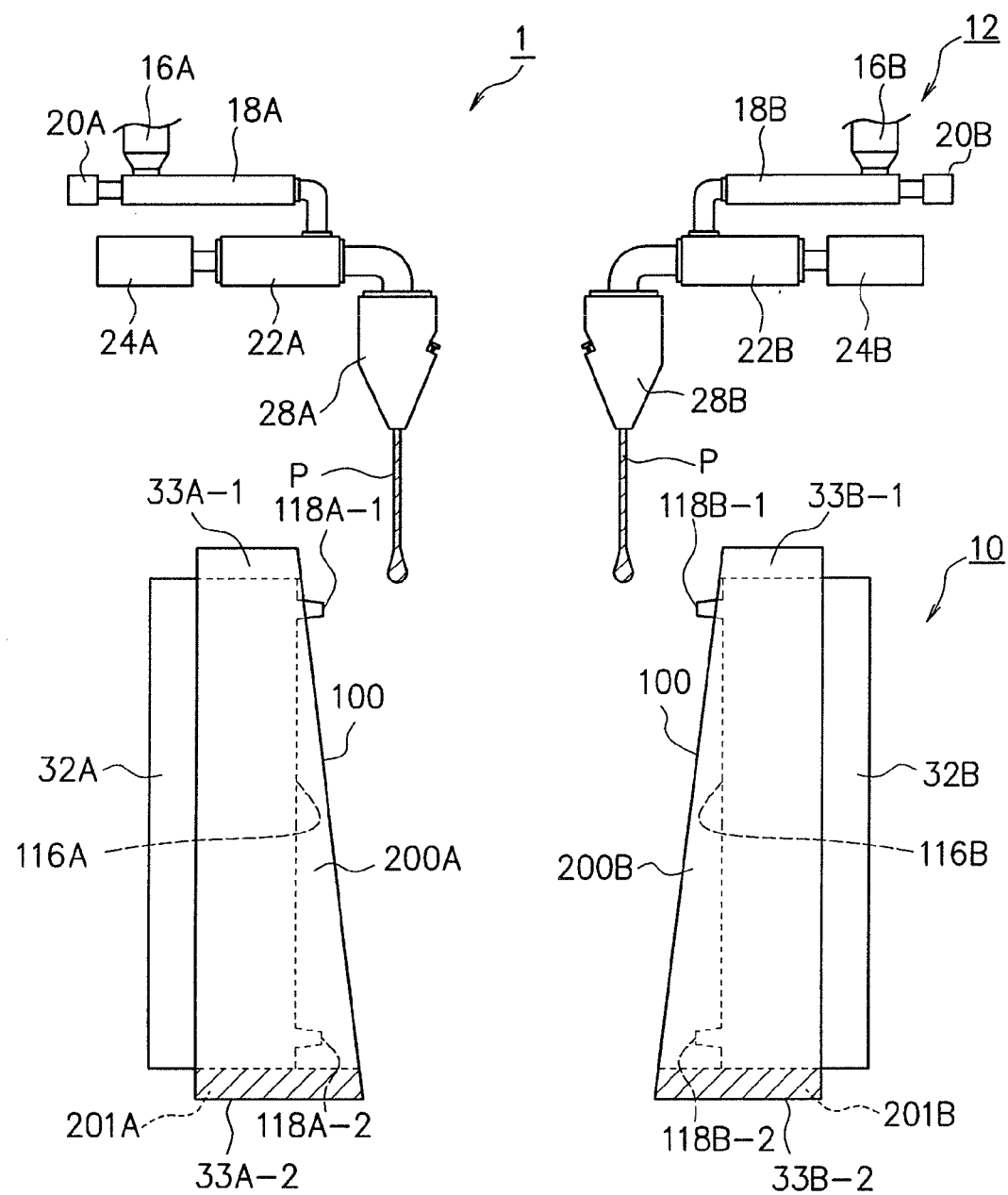
FIG. 23 shows another configuration example of the molding apparatus in the second embodiment.

However, as shown in FIG. 23, the bottom frame 33A-2 (33B-2) configuring the lower side of the frame 33A (33B) may protrude toward the thermoplastic resin sheet P, more than the top frame 33A-1 (33B-1) configuring the upper side of the frame 33A (33B). In this structure, the thermoplastic resin sheet P extruded from the extruding machine 12 comes into contact between the top frame 33A-1 (33B-1) and the bottom frame 33A-2 (33B-2). The contacted thermoplastic resin sheet P suspends downward along the contact surface (side surface geometry) 100 of the frame 33A (33B).

In this structure, the thermoplastic resin sheet P suspends downward along the contact surface 100 of the frame 33A (33B). Due to this, friction occurs between the thermoplastic resin sheet P and the frame 33A (33B). Therefore, the self-weight exerted on the thermoplastic resin sheet P is reduced due to this friction. This can control draw-down of the thermoplastic resin sheet P.

Moreover, it is desirable to construct the frame 33A (33B) shown in FIG. 23 similar to the frame 33A (33B) shown in FIG. 12, so that the first frame 201A (201B) and the second frame 200A (200B) can be moved independently. This can prevent the resin from accumulating at the uppermost end of the central part 33A-2″ of the bottom frame 33A-2.

Third Embodiment

The third embodiment is explained as follows.

<An Overview of the Molding Apparatus 1 of the Third Embodiment>

First, the overview of the molding apparatus 1 of the third embodiment is explained with reference to FIG. 24.

The molding apparatus 1 in the present embodiment includes the extruding machine 12 and the clamping machine 10. The extruding machine 12 extrudes the molten and mixed thermoplastic resin P in the sheet form. The clamping machine 10 brings the frame 33A (33B), which can move relative to the split mold block 32A (32B) and is located along the perimeter of the split mold block 32A (32B), into contact with the thermoplastic resin P extruded in the sheet form from the extruding machine 12. Next, the clamping machine 10 adsorbs by a vacuum the thermoplastic resin P that faces the cavity surface 116A (116B) of the split mold block 32A (32B) to the cavity surface 116A (116B). Therefore, the thermoplastic resin sheet P can be shaped into the shape according to the cavity surface 116A (116B). Consequently, a resin molded product is formed by closing the split mold block 32A and the split mold block 32B.

The frame 33A (33B) of the molding apparatus 1 in the present embodiment is movable relative to the split mold block 32A (32B). The bottom frame 33A-2 (33B-2) configuring the lower side of the frame 33A (33B) protrudes more toward the thermoplastic resin P than the top frame 33A-1 (33B-1) configuring the upper side of the frame 33A (33B).

In the molding apparatus 1 of the present embodiment having the above mentioned structure, the thermoplastic resin P extruded in the sheet form from the extruding machine 12 suspends downward along the contact surface 100 of the frame 33A (33B). Therefore, the frame 33A (33B) can come into contact with the thermoplastic resin P. As a result, gaps appearing between the frame 33A (33B) and the thermoplastic resin P can be prevented. Therefore, the thermoplastic resin P can be shaped into the shape according to the cavity surface 116A (116B). Below, the molding apparatus 1 of the present embodiment is explained in detail with reference to the attached drawings.

<A Configuration Example of the Molding Apparatus 1>

Figure 27:
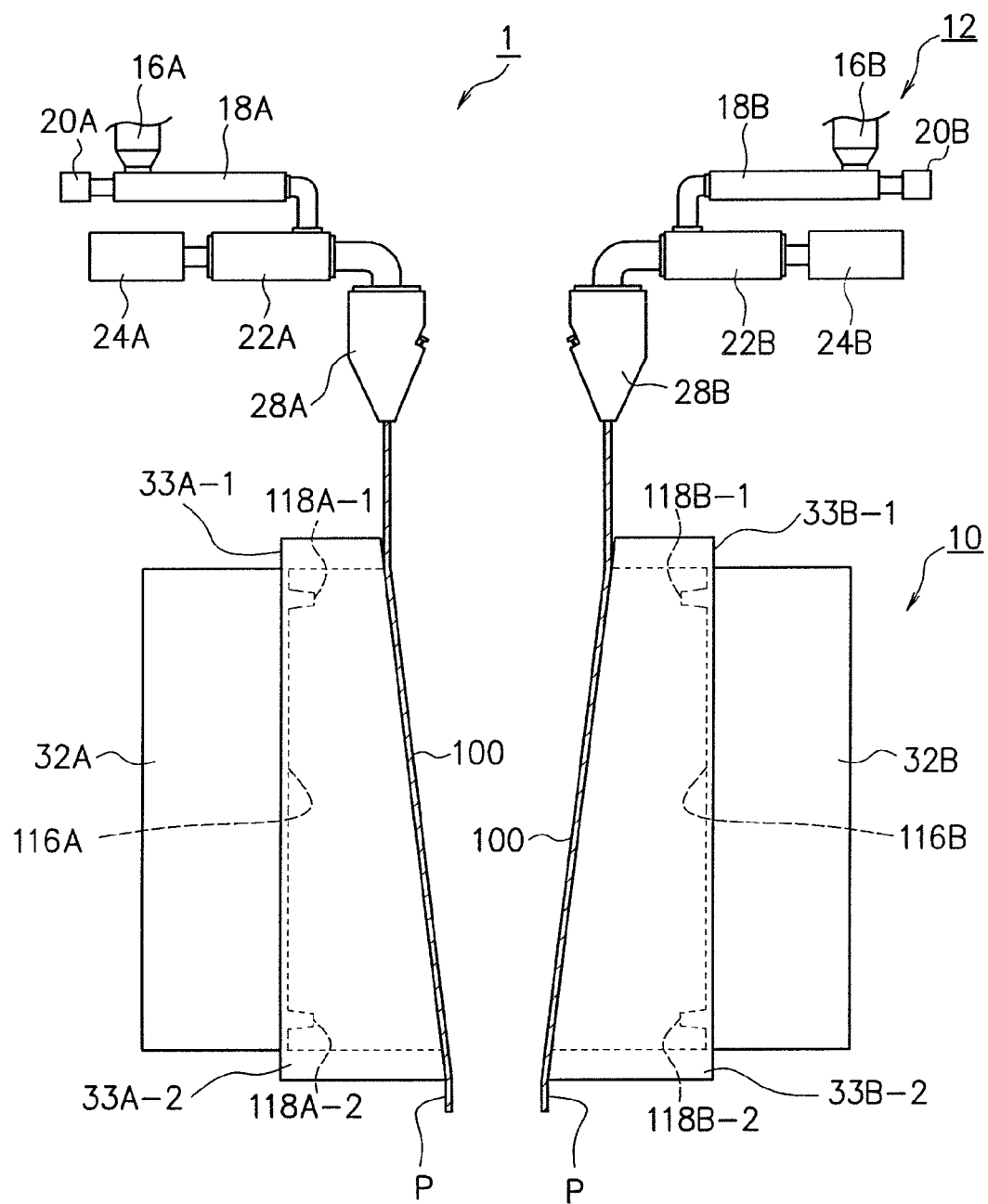
FIG. 27 shows the situation where the frame has made contact with the thermoplastic resin sheet extruded from the T-Die, in the molding apparatus shown in FIG. 24.

First, the configuration example of the molding apparatus 1 in the present embodiment is explained with reference to FIG. 24. The molding apparatus 1 of the present embodiment has a structure similar to that of the molding apparatus 1 of the second embodiment shown in FIG. 12, except for the frame 33A (33B). Therefore, the explanations of parts having the same symbols as FIG. 12 are omitted. Moreover, the operation of the frame 33A on the thermoplastic resin sheet P is the same as that of the frame 33B. Therefore, in this explanation of the configuration example of the molding apparatus 1, the structure and operation of the frame 33A are mainly explained. In the contact surface 100 of the frame 33A in the present embodiment, as shown in FIGS. 24 and 25B, the bottom frame 33A-2 configuring the lower side of the frame 33A protrudes more toward the front than the top frame 33A-1 configuring the upper side of the frame 33A. As the frame 33A is moved ahead, as shown in FIG. 27, the bottom frame 33A-2 of the frame 33A will be closer to the split mold block 32B than the suspending position of the thermoplastic resin sheet P. Due to this, the thermoplastic resin sheet P suspended downward from the T-Die 28A comes into contact with the frame 33A, and, after contact, suspends downward along the contact surface 100 of the frame 33A. This ensures that the frame 33A comes into contact with the thermoplastic resin sheet P. Thus, gaps appearing between the frame 33A and the thermoplastic resin sheet P can be prevented. Moreover, the thermoplastic resin sheet P suspends downward along the contact surface 100 of the frame 33A. Due to this, friction occurs between the thermoplastic resin sheet P and the frame 33A. Therefore, the self-weight exerted on the thermoplastic resin sheet P is reduced by this friction. This can control draw-down of the thermoplastic resin sheet P.

Moreover, it is preferable that a position of the frame 33A, where the thermoplastic resin sheet P suspended downward from the T-Die 28A comes into contact, be lower than the uppermost end of the top frame 33A-1. This is because, when the uppermost end of the top frame 33A-1 comes in contact with the thermoplastic resin sheet P, part of the resin of the thermoplastic resin sheet P is mounted on the uppermost end of the top frame 33A-1, which can cause accumulation of resin at the uppermost end of the top frame 33A-1. Therefore, it is preferable for the thermoplastic resin sheet P to make contact at a point lower than the uppermost end of the top frame 33A-1. Thus, possible resin accumulation can be avoided.

Moreover, the contacting position of the frame 33A with the thermoplastic resin sheet P should preferably be lower than the uppermost end of the top frame 33A-1, and more preferably higher than the uppermost end of the split mold block 32A. In this case, after coming into contact with the frame 33A, the thermoplastic resin sheet P suspends downward along the contact surface 100 of the frame 33A, which can form a closed space inside the frame 33A and the cavity surface 116A. Moreover, when the contacting position of the frame 33A with the thermoplastic resin sheet P is lower than the uppermost end of the split mold block 32A, a gap occurs between the lower end of the top frame 33A-1 of the frame 33A and the contacting position of the thermoplastic resin sheet P with the frame 33A. Due to this, the closed space cannot be formed by the thermoplastic resin sheet P, the frame 33A and the cavity surface 116A. In this case, the pinch-off part 118A-1 at the upper end comes into contact with the lateral surface of the thermoplastic resin sheet P. Then, a closed space is formed by the thermoplastic resin sheet P, the pinch-off part 118A-1 at the upper end, the cavity surface 116A, and the frame 33A. Moreover, as the method of bringing the pinch-off part 118A-1 at the upper end into contact with the lateral surface of the thermoplastic resin sheet P, there are a method in which the pinch-off part 118A-1 at the upper end is made to contact the lateral surface of the thermoplastic resin sheet P by moving the split mold block 32A forward, and a method in which the lateral surface of the thermoplastic resin sheet P is made to contact the pinch-off part 118A-1 at the upper end by moving the frame 33A, which is in contact with the thermoplastic resin sheet P, backward. Due to this, the closed space can be formed by the thermoplastic resin sheet P, the pinch-off part 118A-1 at the upper end, the cavity surface 116A, and the frame 33A.

Figure 26A:
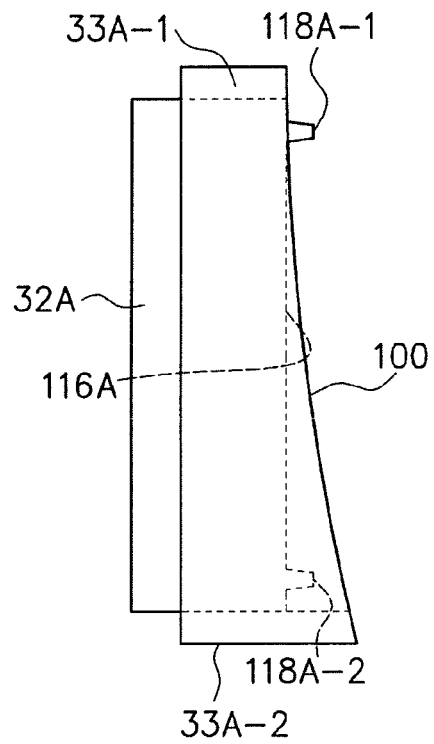
FIGS. 26A, 26B, 26C, and 26D are the second figures showing the configuration example of the split mold blocks and the frames in the third embodiment.
Figure 26B:
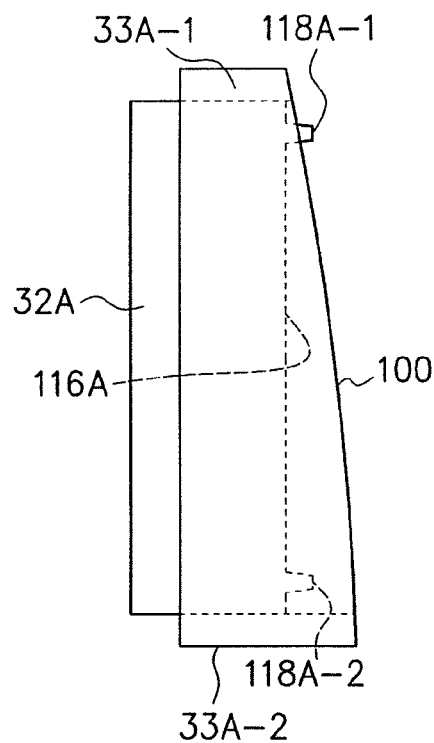

Moreover, the contact surface 100 between the top frame 33A-1 and the bottom frame 33A-2 of the frame 33A shown in FIG. 25B has a planar shape. However, the contact surface 100 between the top frame 33A-1 and the bottom frame 33A-2 need not necessarily be a planar shape, as long as the shape allows the downward suspending of the thermoplastic resin sheet P along the contact surface 100 of the frame 33A. For example, as shown in FIGS. 26A and 26B, a part of this contact surface 100 can also be a curved surface. Moreover, as shown in FIG. 25B, when the contact surface 100 has a planar shape, it is preferable to set the incline angle (θ) of the contact surface 100 in the frame 33A within the range of 2 to 40 degrees, and more preferably within the range of 5 to 15 degrees. If the incline angle (θ) of the contact surface 100 is too small, the contact surface 100 will have to be elongated. Otherwise, the probability of the thermoplastic resin sheet P coming into contact with the uppermost end of the top frame 33A-1 of the frame 33A will be high. Moreover, if the incline angle (θ) of the contact surface 100 is too large, the protruding amount of the bottom frame 33A-2 will be large. Therefore, the probability of the thermoplastic resin sheets P coming into contact with each other will be high. Thus, the incline angle (θ) of the contact surface 100 should preferably be set within the specific range (2 to 40 degrees) corresponding to the length of the contact surface 100. Moreover, the incline angle (θ) of the contact surface 100 should more preferably be set within the specific range (2 to 40 degree) taking into consideration the frictional force that occurs between the thermoplastic resin sheet P and the frame 33A.

Figure 26C:
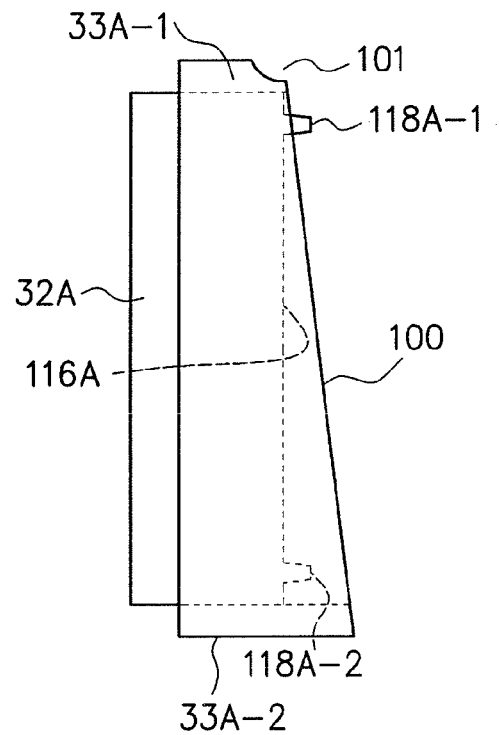

Moreover, in order to prevent resin from accumulating in the uppermost end of the top frame 33A-1 of the frame 33A, as shown in FIG. 26C, it is possible to provide a notch 101 at the uppermost end of the top frame 33A-1. This can reduce the probability of the thermoplastic resin sheet P contacting the uppermost end of the top frame 33A-1 of the frame 33A. Moreover, the shape of the notch 101 is not limited to a specific shape. As long as contact of the thermoplastic resin sheet P with the uppermost end of the top frame 33A-1 is prevented, any shape is acceptable for the notch 101.

Figure 26D:
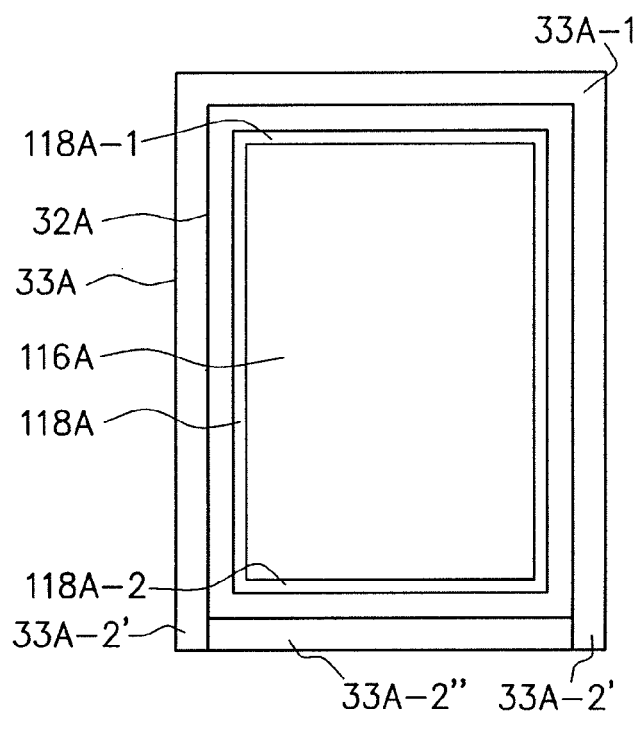

Moreover, in the present embodiment, the thermoplastic resin sheet P suspends downward along the contact surface 100 of the frame 33A. Therefore, resin may be accumulated even in the uppermost end of the bottom frame 33A-2 of the frame 33A. Therefore, as shown in FIG. 26D, only the both ends (parts of the bottom frame 33A-2 configuring the contact surface 100 of the frame 33A) 33A-2' of the bottom frame 33A-2 may be more protruded forward than the top frame 33A-1. In such a case, the central part 33A-2" other than both the ends 33A-2' of the bottom frame 33A-2 will be depressed to an inner side. Therefore, the thermoplastic resin sheet P along the contact surface 100 of the frame 33A will come into contact with both the ends 33A-2' of the bottom frame 33A-2 when it is suspended downward, but will not come into contact with the center part 33A-2". This prevents the accumulation of resin in the bottom frame 33A-2. However, in this case, a gap appears between the thermoplastic resin sheet P and the central part 33A-2" of the bottom frame 33A-2. Thus, it becomes necessary to bring the pinch-off part 118A-2 of the lower end to come in contact with the lateral surface of the thermoplastic resin sheet P.

Moreover, as another method to avoid the accumulation of resin, the central part 33A-2" of the bottom frame 33A-2 may be separated from the frame 33A. In such a case, preferably, moving the central part 33A-2" independently from the other parts should be possible. In this structure, the central part 33A-2" is moved forward after the thermoplastic resin sheet P suspends downward along the contact surface 100 of the frame 33A and passes the bottom frame 33A-2. Thus, it is then possible to bring the central part 33A-2" in contact with the lateral surface of the thermoplastic resin sheet P.

Moreover, a suction hole may also be provided in the frame 33A to adsorb the thermoplastic resin sheet P. In this structure, it is possible to adsorb the thermoplastic resin sheet P onto the frame 33A by sucking the air through the suction hole. This allows the thermoplastic resin sheet P suspended along the contact surface 100 of the frame 33A to be adsorbed onto the frame 33A (33B). Moreover, the timing to start the sucking of the thermoplastic resin sheet P from the suction hole should preferably be after the thermoplastic resin sheet P is suspended downward from the bottom frame 33A-2 of the frame 33A. Consequently, after the thermoplastic resin sheet P is suspended downward along the contact surface 100 of the frame 33A, the thermoplastic resin sheet P can be adsorbed onto the contact surface 100 of the frame 33A (33B).

<An Example of the Molding Process in the Molding Apparatus 1>

Next, the molding process of the resin molded product by the molding apparatus 1 of the present embodiment is explained with reference to FIGS. 24, and 27 through 30.

Figure 24:
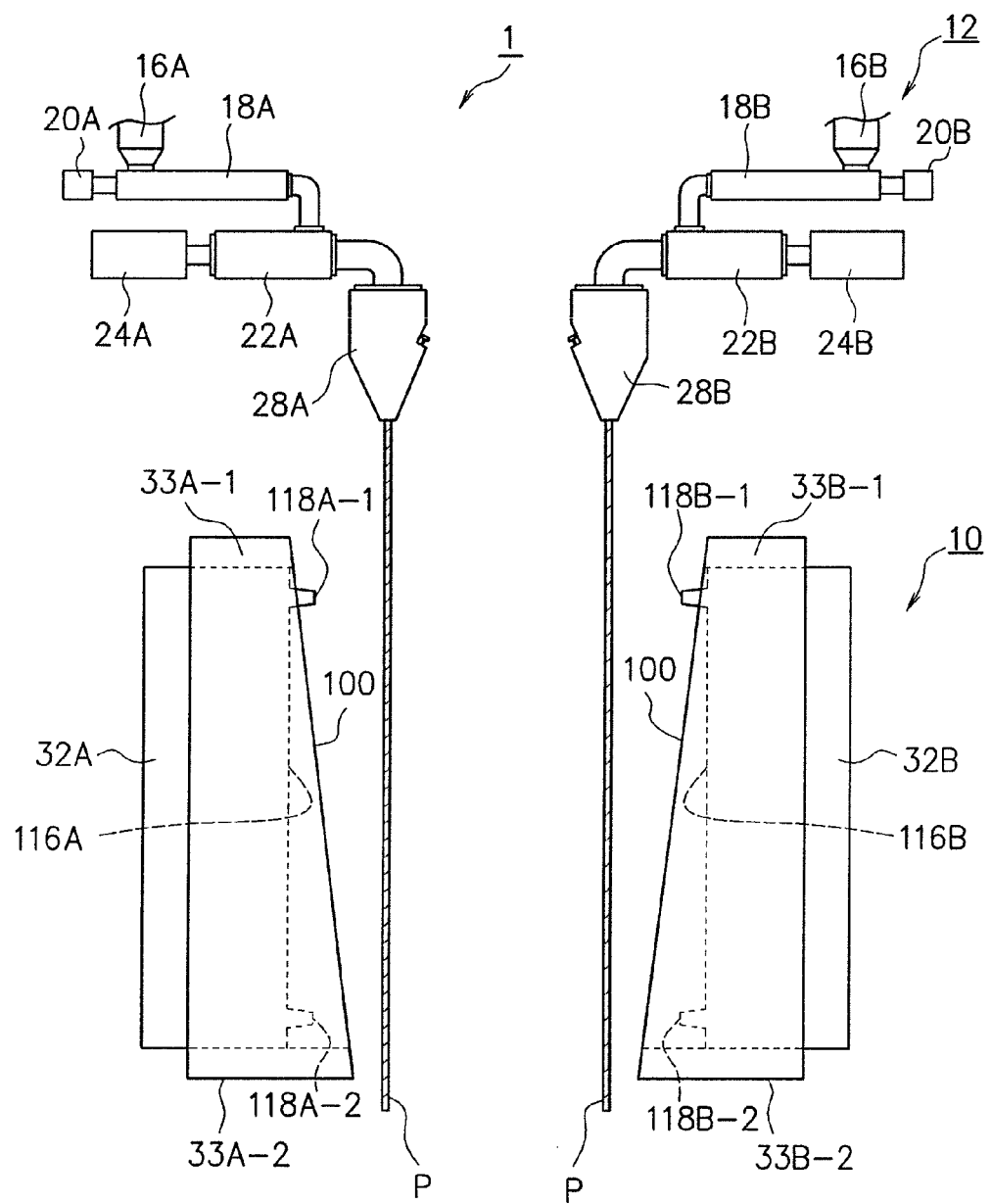
FIG. 24 shows the configuration example of the molding apparatus in a third embodiment.

First, as shown in FIG. 24, the thermoplastic resin sheet P is extruded from the T-Die 28A (28B). The extruded thermoplastic resin sheet P is suspended between the pair of split mold block 32A and the split mold block 32B.

Moreover, as shown in FIG. 27, the frame 33A (33B) located along the perimeter of the split mold block 32A (32B) is moved forward toward the thermoplastic resin sheet P. This brings the frame 33A (33B) into contact with the thermoplastic resin sheet P.

In the frame 33A (33B) of the present embodiment, the bottom frame 33A-2 (33B-2) is protruded more toward the front than the top frame 33A-1 (33B-1). Therefore, the thermoplastic resin sheet P suspended from the T-Die 28A (28B) can be brought into contact with the frame 33A (33B), and the thermoplastic resin sheet P brought into contact with the frame 33A (33B) can be suspended downward along the contact surface 100 of the frame 33A (33B). As a result, as shown in FIG. 27, a closed space can be formed by the thermoplastic resin sheet P, the frame 33A (33B) and the cavity surface 116A (116B). Also, the thermoplastic resin sheet P suspends downward along the contact surface 100 of the frame 33A. Thus, friction occurs between the thermoplastic resin sheet P and the frame 33A. Therefore, the self-weight exerted on the thermoplastic resin sheet P is reduced due to this friction. This can control draw-down of the thermoplastic resin sheet P.

Figure 28:
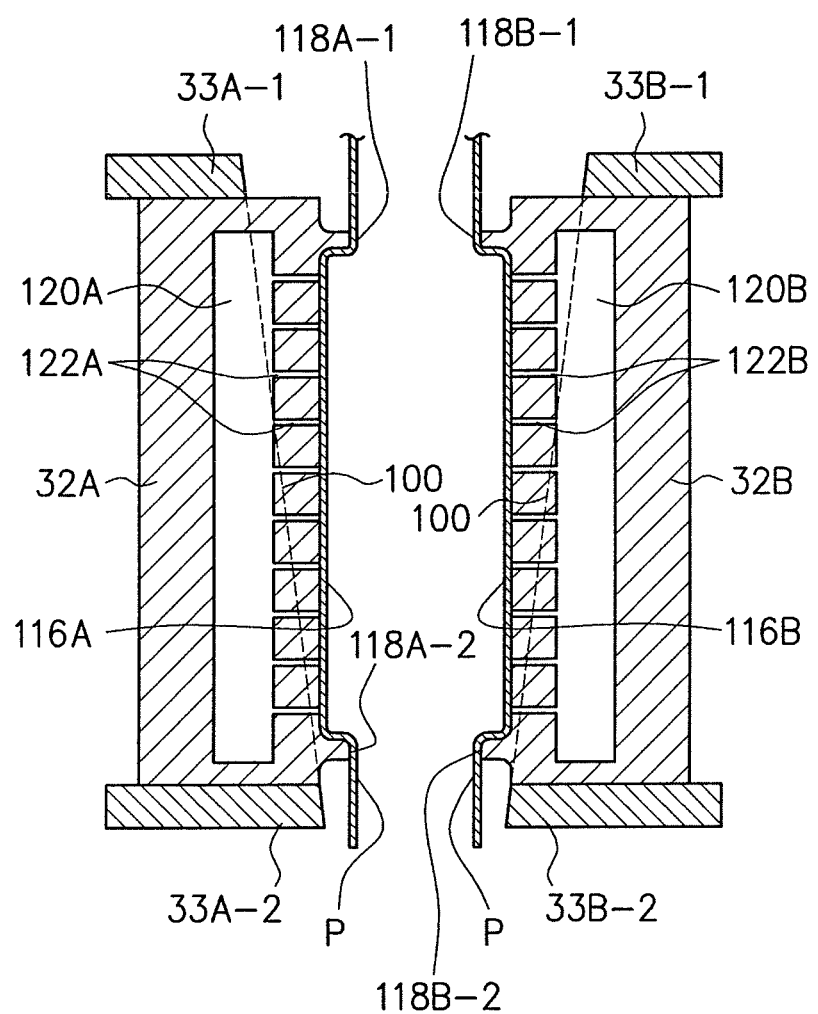
FIG. 28 shows the situation where the thermoplastic resin sheet is adsorbed by a vacuum onto the cavity surface of the split mold blocks, following the situation shown in FIG. 27.

When the thermoplastic resin sheet P brought into contact with the frame 33A (33B) is suspended downward along the contact surface 100 of the frame 33A (33B) and reaches a point lower than the lowermost end of the bottom frame 33A-2 (33B-2) of the frame 33A (33B), the frame 33A (33B) is moved backward. Therefore, the thermoplastic resin sheet P can be brought into contact with the pinch-off parts 118, 118A-1 (118B-1), and 118A-2 (118B-2). Subsequently, as shown in FIG. 28, the air within the closed space is sucked by the vacuum suction chamber 120A (120B) through the suction hole 122A (122B). This allows the thermoplastic resin sheet P to be adsorbed onto the cavity surface 116A (116B). Consequently, the thermoplastic resin sheet P is shaped into the shape according to the cavity surface 116A (116B). Moreover, while sucking the air within the closed space, preferably, the thermoplastic resin sheet P should be shaped into the shape according to the cavity surface 116A (116B) after the thermoplastic resin sheet P is inflated toward the cavity surface 116A (116B). Therefore, the thermoplastic resin sheet P can effectively be shaped into the shape according to the cavity surface 116A (116B).

Figure 29:
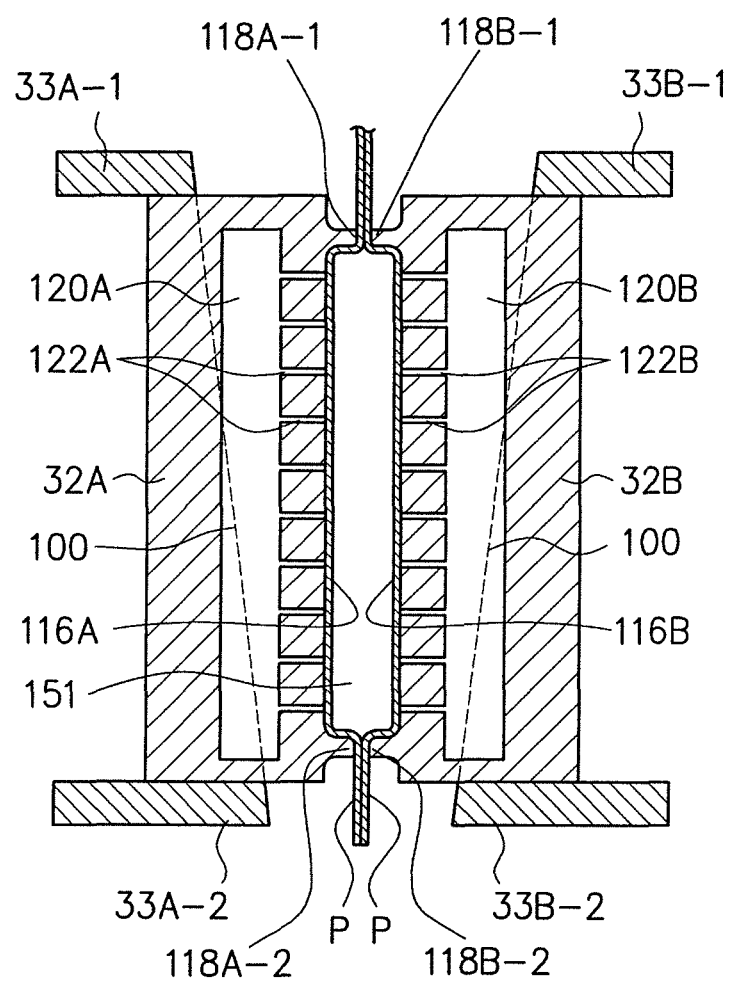
FIG. 29 shows the situation where the split mold blocks are closed, following the situation shown in FIG. 28.

Next, only the split mold block 32A (32B) is moved forward while the frame 33A (33B) is moved backward. Therefore, as shown in FIG. 29, the split mold blocks 32A and 32B move closer to each other and are closed. Consequently, the pinch-off parts 118, 118A-1 (118B-1), and 118A-2 (118B-2) of the split mold block 32A (32B) weld the rims of the thermoplastic resin sheet P together. Therefore, a parting line PL is formed at the joining surface of the two thermoplastic resin sheets P. Moreover, a sealed hollow section 151 is formed inside the two thermoplastic resin sheets P.

Figure 30:
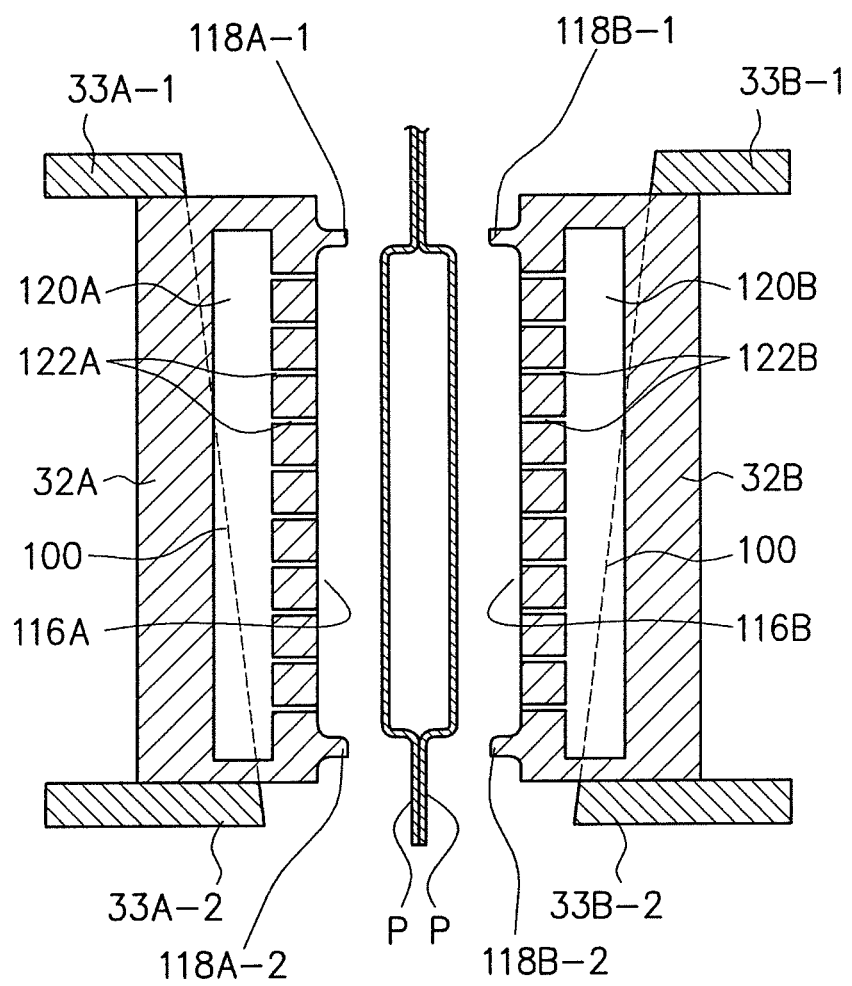
FIG. 30 shows the situation where the split mold blocks are opened, following the situation shown in FIG. 29.

Next, as shown in FIG. 30, the split mold blocks 32A and 32B are opened by moving the split mold blocks 32A and 32B away from each other. Then, the resin molded product is ejected, and the burrs on the external surface of the resin molded product are removed. This completes the molding of the resin molded product.

<Operation/Effect of the Molding Apparatus 1 in the Present Embodiment>

In this way, the frame 33A (33B) is provided in the molding apparatus 1 of the present embodiment. The frame 33A (33B) is located along the perimeter of the split mold block 32A (32B) and is movable relative to the split mold block 32A (32B). The bottom frame 33A-2 (33B-2) configuring the lower part of the frame 33A (33B) is protruded more toward the thermoplastic resin sheet P than the top frame 33A-1 (33B-1) configuring the upper part of the frame 33A (33B).

Therefore, the thermoplastic resin sheet P extruded from the extruding machine 12 comes into contact between the top frame 33A-1 (33B-1) and the bottom frame 33A-2 (33B-2). Subsequently, the thermoplastic resin sheet P suspends downward along the contact surface 100 of the frame 33A (33B). This ensures that the frame 33A (33B) comes into contact with the thermoplastic resin sheet P. This prevents gaps from appearing between the frame 33A (33B) and the thermoplastic resin sheet P. Therefore, the thermoplastic resin sheet P can be shaped into the shape according to the cavity surface 116A (116B).

Moreover, in the above mentioned embodiment, the resin molded product is formed using the molding apparatus 1 shown in FIG. 24. However, it is also possible to form the resin molded product using the molding apparatus 1 having a pair of rollers shown in FIG. 31.

Figure 31:
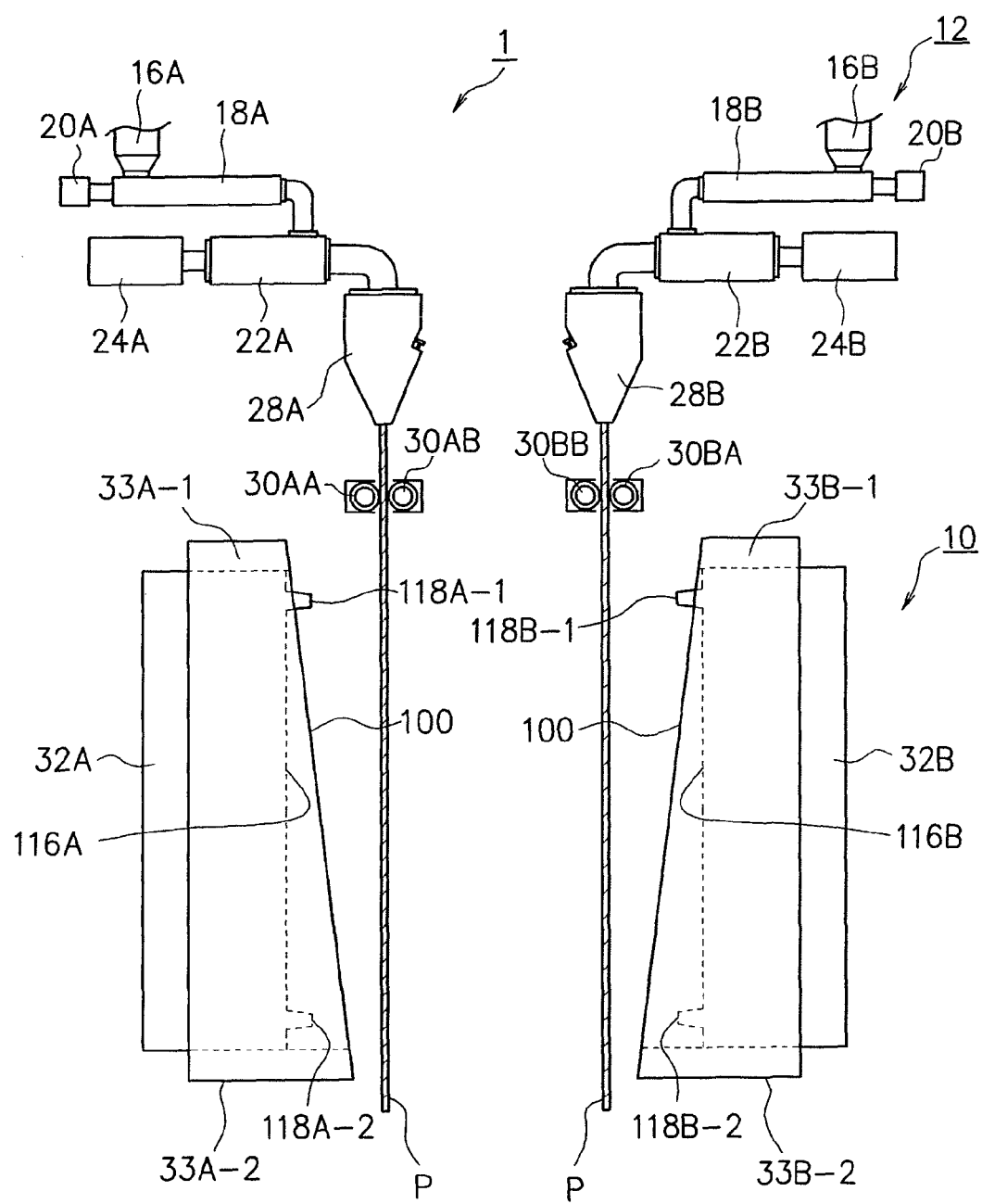
FIG. 31 shows another configuration example of the molding apparatus in the third embodiment.

In the molding apparatus 1 shown in FIG. 31, the wall thickness of the thermoplastic resin sheet P is adjusted by passing it through a pair of rollers 30AA and 30AB (30BB and 30BA). Therefore, the occurrence of the curtain effect can be reduced, and a thermoplastic resin sheet P with a thin wall can be formed. However, the curtain effect may occur even after passing through these roller pairs. Therefore, even when molding the resin molded product using the molding apparatus 1 shown in FIG. 31, it is desirable to use the frame 33A (33B) similar to that of the molding apparatus 1 shown in FIG. 24. Therefore, a closed space can definitely be formed by the thermoplastic resin sheet P, the frame 33A (33B) and the cavity surface 116A (116B). Thus, the vacuum molding can be done stably. Moreover, when molding the resin molded product using the molding apparatus 1 having a pair of rollers, as shown in FIG. 31, it is also possible to mold a resin molded product having an average wall thickness of 1 mm or less.

Also, in the embodiment mentioned above, the thermoplastic resin sheet P is extruded from the T-Die 28A (28B), as shown in FIG. 27, the frame 33A (33B) located along the perimeter of the split mold block 32A (32B) is brought into contact with the thermoplastic resin sheet P. Then, the thermoplastic resin sheet P is suspended downward along the contact surface 100 of the frame 33A (33B). However, the thermoplastic resin sheet P may be extruded from the T-Die 28A (28B) after the frame 33A (33B) is moved in advance. Even in such a case, it is possible to bring the thermoplastic resin sheet P into contact with the frame 33A (33B) and then to suspend it downward along the contact surface 100 of the frame 33A (33B). In other words, as long as it is possible to suspend the thermoplastic resin sheet P downward along the contact surface 100 of the frame 33A (33B), there are no specific restrictions for the timing of moving the frame 33A (33B). It is possible to move the frame 33A (33B) at any timing.

It is noted that the above-described embodiments are preferred embodiments of the present invention. The scope of the present invention is not limited to the above-described embodiments. The present invention can be implemented in various modified modes without departing from the gist of the present invention.

What is claimed is:

1. A molding apparatus that adsorbs thermoplastic resin extruded in a sheet form from an extruding machine and suspended in a vertical direction, onto a cavity surface of a mold, and shapes the thermoplastic resin into a shape according to the cavity surface, the molding apparatus comprising:
   a frame that is positioned on a perimeter of the mold and is movable relative to the mold; and
   a suction part for suctioning the thermoplastic resin is provided in the frame, the frame comprising:
   an independently movable first frame member configured to contact the vertically suspended thermoplastic resin; and
   a second frame member provided above the first frame member in the vertical direction, wherein
   the second frame member is separable from the first frame member and configured to be independently movable in a horizontal direction relative to the first frame member so as to contact the vertically suspended thermoplastic resin prior to the first frame member, to prevent resin accumulation on the first frame member during a shaping of the thermoplastic resin, and to be less susceptible to a thermal expansion such that the first frame member and the second frame member are movable in a stable manner when subjected to the thermal expansion.

2. The molding apparatus according to claim 1, wherein the first frame member includes a bottom frame configuring a lower side of the frame, and
   the second frame member includes a top frame configuring an upper side of the frame.

3. The molding apparatus according to claim 1, wherein the frame is provided to surround the mold in a square shape,
   the first frame member configures a lower edge of the square shape, and
   the second frame member configures an upper edge as well as left and right edges of the square shape merged together.

4. The molding apparatus according to claim 1, wherein the suction part is provided in a groove shape.

5. The molding apparatus according to claim 1, wherein the suction part is a plurality of suction members that are provided in a plurality of columns.

6. The molding apparatus according to claim 1, wherein the suction part further comprises:
   a recess recessed inwardly of a contact surface to contact the thermoplastic resin;

a hole defined by at least a partial opening of a bottom surface of the recess;

a lid member positioned in the recess such that at least a portion of the lid member contacts the bottom surface of the recess; and a groove-shaped gap provided between a side wall of the recess and a side wall of the lid member, and communicates with the hole, wherein the hole communicates with a decompressible suction path.

7. The molding apparatus according to claim 6, wherein the recess comprises:

a first recess recessed inwardly of the contact surface; and a second recess recessed further inwardly of a bottom surface of the first recess, wherein the hole is defined by at least a partial opening of a bottom surface of the second recess.

8. The molding apparatus according to claim 6, wherein a width of the grooved shaped gap is 0.3 mm or more.

9. The molding apparatus according to claim 1, wherein a bottom frame configuring a lower side of the frame protrudes toward the thermoplastic resin more than a top frame configuring an upper side of the frame.

10. The molding apparatus according to claim 9, wherein a notch is provided at an upper end of the top frame.

11. A molding apparatus that adsorbs thermoplastic resin extruded in a sheet form from an extruding machine, onto a cavity surface of a mold, and shapes the thermoplastic resin into a shape according to the cavity surface, the molding apparatus comprising:

a frame that is positioned on a perimeter of the mold and is movable relative to the mold, the frame comprising:

an independently movable first frame member configured to contact the vertically suspended thermoplastic resin; and a second frame member provided above the first frame member in the vertical direction, wherein the second frame member is separable from the first frame member and configured to be independently movable in a horizontal direction relative to the first frame member so as to contact the vertically suspended thermoplastic resin prior to the first frame member, to prevent resin accumulation on the first frame member during a shaping of the thermoplastic resin, and to be less susceptible to a thermal expansion such that the first frame member and the second frame member are movable in a stable manner when subjected to the thermal expansion; and a suction part for suctioning the thermoplastic resin is provided in the frame, the suction part comprising:

a recess that includes a bottom surface and that is recessed inwardly of a contact surface to contact the thermoplastic resin;

a hole that is defined by at least a partial opening of the bottom surface of the recess and that extends through the bottom surface of the recess;

a lid member positioned in the recess such that at least a portion of the lid member contacts the bottom surface of the recess; and a groove-shaped gap provided between a side wall of the recess and a side wall of the lid member, and communicates with the hole, wherein the hole communicates with a decompressible suction path.

12. The molding apparatus according to claim 11, wherein the recess comprises:

a first recess recessed inwardly of the contact surface; and a second recess recessed further inwardly of a bottom surface of the first recess, wherein the hole is defined by at least a partial opening of a bottom surface of the second recess.

13. The molding apparatus according to claim 11, wherein a width of the grooved shaped gap is 0.3 mm or more.

* * * * *